US010097813B2

(12) United States Patent
Stenger et al.

(10) Patent No.: US 10,097,813 B2
(45) Date of Patent: Oct. 9, 2018

(54) METHODS AND SYSTEMS FOR CAPTURING 3D SURFACE GEOMETRY

(75) Inventors: Bjorn Stenger, Cambridge (GB); Atsuto Maki, Cambridge (GB); Frank Perbet, Cambridge (GB); Oliver Woodford, Cambridge (GB); Roberto Cipolla, Cambridge (GB); Robert Anderson, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1084 days.

(21) Appl. No.: 13/408,488

(22) Filed: Feb. 29, 2012

(65) Prior Publication Data
US 2012/0287247 A1  Nov. 15, 2012

(30) Foreign Application Priority Data

May 9, 2011 (GB) .................................. 1107716.1

(51) Int. Cl.
*H04N 13/25* (2018.01)
*H04N 13/128* (2018.01)
(Continued)

(52) U.S. Cl.
CPC ............. *H04N 13/25* (2018.05); *G06T 7/593* (2017.01); *H04N 13/122* (2018.05);
(Continued)

(58) Field of Classification Search
CPC .. H04N 13/128; H04N 13/125; H04N 13/144; H04N 13/25; H04N 13/271; H04N 13/268
See application file for complete search history.

(56) References Cited

U.S. PATENT DOCUMENTS 5,809,179 A * 9/1998 Marimont et al. ............ 382/254
5,974,168 A * 10/1999 Rushmeier et al. .......... 382/141
(Continued)

FOREIGN PATENT DOCUMENTS

GB  2 452 944 A  3/2009
JP  2003-214826 A  7/2003
(Continued)

OTHER PUBLICATIONS

Martin Klaudiny et al., "High-detail 3D capture of facial performance", 3d PVT 2010 conference, Session 12, May 20, 2010, pp. 1-8.*
(Continued)

*Primary Examiner* — David N Werner
(74) *Attorney, Agent, or Firm* — Oblon, McClelland, Maier & Neustadt, L.L.P.

(57) ABSTRACT

A system for capturing 3D image data of a scene, including three light sources, each configured to emit light at a different wavelength to the other two sources and to illuminate the scene to be captured; a first video camera configured to receive light from the light sources which has been reflected from the scene, to isolate light received from each of the light sources, and to output data relating to the image captured for each of the three light sources; a depth sensor configured to capture depth map data of the scene; and an analysis unit configured to receive data from the first video camera and process the data to obtain data relating to a normal field obtained from the images captured for each of the three light sources, and to combine the normal field data with the depth map data to capture 3D image data of the scene.

19 Claims, 19 Drawing Sheets

(51) Int. Cl.
*H04N 13/122* (2018.01)
*H04N 13/271* (2018.01)
*H04N 13/254* (2018.01)
*G06T 7/593* (2017.01)
*H04N 13/125* (2018.01)
*H04N 13/268* (2018.01)

(52) U.S. Cl.
CPC ......... *H04N 13/128* (2018.05); *H04N 13/254* (2018.05); *H04N 13/271* (2018.05); *G06T 2207/10021* (2013.01); *G06T 2207/10024* (2013.01); *G06T 2207/10152* (2013.01); *G06T 2207/20221* (2013.01); *H04N 13/125* (2018.05); *H04N 13/268* (2018.05)

(56) References Cited

U.S. PATENT DOCUMENTS

| | | | |
|---|---|---|---|
| 6,750,873 B1* | 6/2004 | Bernardini et al. | 345/582 |
| 7,881,552 B1* | 2/2011 | Gerber | H04N 7/0132 382/264 |
| 2004/0105580 A1* | 6/2004 | Hager et al. | 382/154 |
| 2004/0258309 A1* | 12/2004 | Keaton et al. | 382/190 |
| 2006/0232665 A1* | 10/2006 | Schowengerdt | G02B 27/0093 348/51 |
| 2006/0285747 A1* | 12/2006 | Blake et al. | 382/180 |
| 2007/0139612 A1* | 6/2007 | Butler-Smith | H04N 13/271 351/201 |
| 2008/0123937 A1* | 5/2008 | Arias Estrada et al. | 382/154 |
| 2009/0073259 A1* | 3/2009 | Hernandez et al. | 348/48 |
| 2009/0297020 A1 | 12/2009 | Beardsley et al. | |
| 2010/0328457 A1* | 12/2010 | Lee | 348/139 |
| 2011/0028183 A1 | 2/2011 | Yun | |
| 2011/0115886 A1* | 5/2011 | Nguyen | G06T 5/003 348/47 |
| 2012/0249750 A1* | 10/2012 | Izzat | G06T 7/0022 348/47 |
| 2012/0314037 A1* | 12/2012 | Nehmadi et al. | 348/48 |
| 2013/0169747 A1* | 7/2013 | Gerber | H04N 7/0132 348/43 |
| 2016/0088289 A1* | 3/2016 | Trumbull | H04N 13/0296 348/47 |

FOREIGN PATENT DOCUMENTS

| | | |
|---|---|---|
| JP | 2009-20080 A | 1/2009 |
| JP | 2009-81853 A | 4/2009 |

OTHER PUBLICATIONS

Robert J. Woodham, "Photometric method for determining surface orientation from multiple images", Optical Engineering, Jan./Feb. 1980, vol. 19, No. 1, pp. 139-144.*

M. K. Chung, "The Gaussian Kernel", U. of Wis. (2007), http://www.stat.wisc.edu/~mchung/teaching/MIA/reading/diffusion.gaussian.kernel.pdf (Year: 2007).*

Japanese Office Action dated Apr. 23, 2013 in Patent Application No. 2012-107495 with English Translation.

United Kingdom Search Report dated Aug. 17, 2011 in patent application No. GB1107716.1.

Carlos Hernandez, et al., "Non-rigid Photometric Stereo with Colored Lights", Proc. ICCV, Rio de Janeiro, Brazil, Oct. 2007, 8 pages.

Martin Klaudiny, et al., "High-detail 3D capture of facial performance", http://www.3dpvt2010.org, Session 12, May 20, 2010, pp. 1-8.

Diego Nehab, et al., "Efficiently Combining Positions and Normals for Precise 3D Geometry", ACM SIGGRAPH, 24 (3), 2005, 8 pages.

Wan-Chun Ma, et al., "Rapid Acquisition of Specular and Diffuse Normal Maps from Polarized Spherical Gradient Illumination", Eurographics Symposium on Rendering, Sep. 2007, 12 pages.

Zsolt Janko, et al., "Colour Dynamic Photometric Stereo for Textured Surfaces", Asian Conference on Computer Vision, 2010, pp. 1-12.

Daniel Vlasic, et al., "Dynamic Shape Capture using Multi-View Photometric Stereo", ACM Trans. Graphics (Proc. SIGGRAPH Asia) 28(5), Dec. 2009, 11 pages.

* cited by examiner

METHODS AND SYSTEMS FOR CAPTURING 3D SURFACE GEOMETRY

FIELD

Embodiments of the present invention relate generally to methods and systems for capturing 3D image data

BACKGROUND

Capture of deforming surfaces is becoming increasingly important for a variety of applications in graphics, medical imaging, and analysis of deployable structures. Practical methods of acquiring high resolution geometry in both the spatial and the temporal domains are required.

BRIEF DESCRIPTION OF THE DRAWINGS

The present invention will now be described with reference to the following embodiments in which.

DETAILED DESCRIPTION

Figure 1:
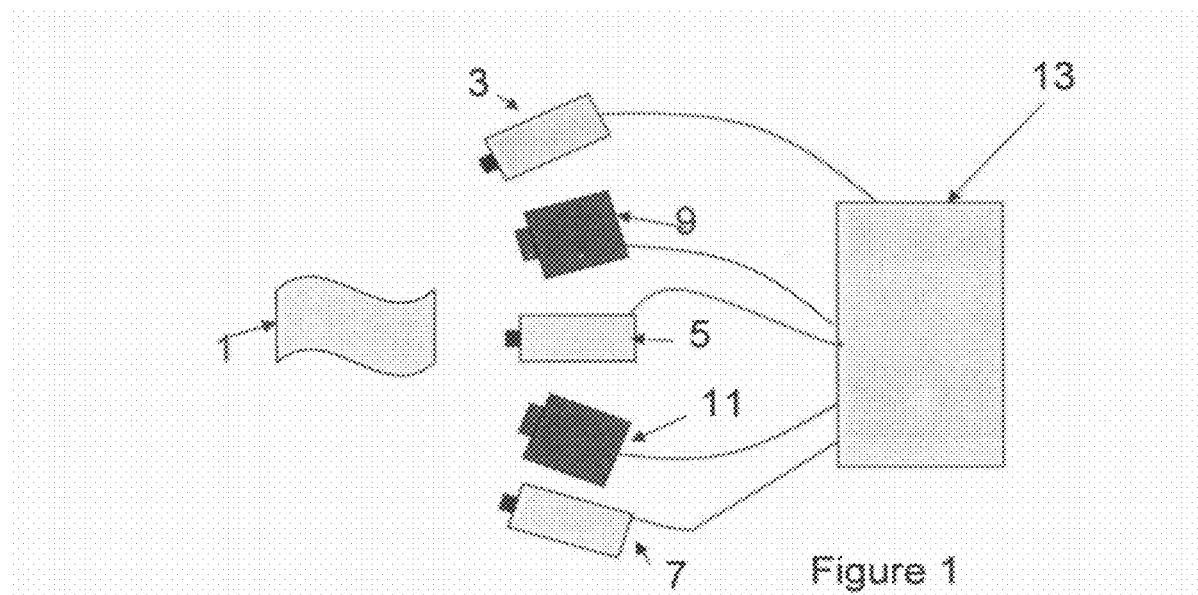
FIG. 1 is a system in accordance with an embodiment of the present invention.

According to one embodiment, a system is provided for capturing 3D image data of a scene, the system comprising:
three light sources, each light source configured to emit light at a different wavelength to the other two sources, the three light sources being configured to illuminate the scene to be captured;
a first video camera configured to receive light from the light sources which has been reflected from the scene, the first video camera being configured to isolate light received from each of the light sources and output data relating to the image captured for each of the three light sources;
a depth sensor configured to capture a first depth map of the scene;
an analysis unit configured to receive data from the first video camera and process said data to obtain data relating to a normal field obtained from the images captured for each of the three light sources, the analysis unit being configured to combine the data relating to the normal field with that of the first depth map to capture 3D image data of the scene.

In an embodiment, the data relating to a normal field are the directions of the vectors normal to the surface of the solid objects in the scene being viewed for each pixel. These are the predicted normal directions determined from the photometric stereo measurement performed by the first video camera. In a further embodiment, the data relating to the normal field is the integrated normal field reducing a second depth map from the normal field.

Although three light sources are recited above, more than three light sources can be used.

The depth sensor may take many different forms. Typically, the depth sensor will produce a depth map with rather lower frequency resolution in 2D Fourier space than that produced from first video camera in combination the three light sources. The first video camera in combination with the three light sources operates together to produce a normal field using so-called photometric stereo methods. Such methods generally produce images with good high frequency resolution in 2D Fourier space. In other words, they produce a normal field which can be converted into a depth map with a lot of detail of the scene being imaged. In an embodiment, a depth sensor will be used which produces a depth map with lower frequency resolution in 2-D Fourier space than that produced by a photometric stereo method.

In one embodiment, the depth sensor comprises the first video camera, a second video camera and a correlation unit, said second video camera being spatially separate from said first video camera, said correlation unit being adapted to correlate the data received from the first and second video cameras to produce a depth map of the scene. This type of depth sensor is the known two-view stereo depth sensor. In another embodiment, an image coding style depth sensor is used which comprises a projector configured to project a pattern on said scene and a camera configured to capture an image of said pattern projected onto the scene, said analysis unit being configured to generate a second depth map from said captured image. In a further embodiment, the depth sensor is a time of flight sensor.

In a further embodiment, a method is provided for producing 3D image data of a dynamic scene, the method comprising:
  receiving photometric image data from a first video camera, said photometric image data comprising video data captured by said first camera of the scene illuminated from three different directions, the data being capable of isolation into the image data captured for each illumination direction;
  receiving data indicating a first depth map of the scene from a depth sensor;
  analysing the data received from the first video camera to provide data related to a normal field, the method further comprising combining the data relating to the normal field with that of the first depth map to produce 3D image data of the scene.

In one embodiment, the data from the first video camera is analysed assuming that the scene to be imaged reflects light in accordance with a Lambertian imaging model, wherein:

$$n=(VL)^{-1}c.$$

Where $c=[c_0 \ c_1 \ c_2]^T$ where $c_0$, $c_1$, $c_2$ are the intensities measured at a pixel in an image captured from illuminating the scene from each of the three directions respectively, n is a vector expressing a normal to a surface of the pixel, V is a matrix which represents the combined response of the surface and the camera to the illumination, and L is a matrix determining the direction of the three illuminating lights. The illumination in the three different directions may be provided by lights of different colours. One embodiment, the lights are red, green and blue. The first video camera may be provided with a filter system which allows it to distinguish between the red, green and blue light. This allows real time capture of data from three illumination directions which can be isolated so that it is possible to analyse the data from each illumination direction separately.

In one embodiment, a calibration procedure is provided, said calibration procedure being configured to determine M, where M=VL. However, in a further embodiment, V and L are determined separately. The matrix L can be determined that the system and is independent of scene changes. However, the matrix V is usually determined for each scene. However, once the matrix V is determined, there is no need to recalculated mid-scene.

In one embodiment, V is determined for each pixel. In a further embodiment, a plurality of matrices V are determined for each scene during calibration such that there are N number of matrices V, where N is an integer from 1 to a value less than the number of pixels in a scene. In this arrangement, the matrix V will be usefully plurality of pixels. In a further embodiment, the matrices $V_{a \in 1, \ldots, N}$ are determined using a RANSAC algorithm. The number N chromaticities may be set by a user. In one embodiment, the system itself automatically determines N. For example, N may be determined on the basis of model selection methods, examples of suitable model selection methods are Bayesian Information Criteria, Akaike Information Criteria or Minimum Description Length Criteria.

The matrices V may be determined in many different ways. In one embodiment the data received from the first video camera comprises image data of the scene illuminated under six different conditions, with two different lighting conditions for each of the three directions of illumination, and the matrices V are determined for each pixel by analysing the data under the six different conditions. In a further embodiment the matrices V are determined for each pixel by analysing the data from the three different illumination directions and by calculating the surface normals from data from the depth sensor.

In a further embodiment, analysing comprises receiving data from said first video camera and said depth sensor on a frame by frame basis, and segmenting the observed scene into regions of constant chromaticity, wherein a matrix of the matrices V are assigned to each region of constant chromaticity. The segmenting may be performed using a Markov Random Field network.

In an embodiment, combining the data relating to the normal field with that of the first depth map to produce 3D image data of the scene, comprises blurring the data relating to the normal field with a noise level, calculating the rotation of the normals of the normal field caused due to blurring and applying this rotation to the normals of the first depth map blurred by the same noise level.

In a further embodiment, the method further comprising:
  capturing the photometric image data by illuminating the scene to be captured with three light sources, each light source configured to emit light at a different wavelength to the other two sources; and
  capturing an image of the scene using a first video camera configured to receive light from the light sources which has been reflected from the scene, and isolating the light reflected from the scene by each of the light sources.

A calibration procedure may be added including acquiring calibration data for aligning the data relating to the second depth map with that of the first depth map, wherein acquiring said calibration data comprises capturing image data of a calibration board, said calibration board having a known pattern with known 3 dimensional relief.

In embodiments, the calibration board comprises at least one feature, wherein said at least one feature is selected from lines, points or shapes which define a discontinuity in both a 2D pattern formed on said calibration board and the 3D relief of said board.

In one embodiment, the discontinuity in the 3D relief is exactly at the position of the discontinuity in the 2D pattern such that the features can be said to common features. In a further embodiment, the features are corresponding features where a feature defined by a discontinuity or boundary in the 2D pattern defines or is defined by the position of a feature in the 3D relief. For example, the feature in the 3D relief may be a circle and the feature in the 2D pattern may be the centre of the circle and vice versa. In an embodiment, corresponding features may be a shape and the centre of the shape or a focus and its corresponding ellipse, elliptical section or circle.

Such a calibration board can be used whenever it is needed to combine image data from two sensors where at least one of the sensors is used to capture data to generate a 3D image.

Thus, such a board can be used with any type of system where it is necessary to combine images from two different sensors and is not limited to the apparatus described above, said calibration board comprises at least one feature, wherein said at least one feature is selected from lines, points or shapes which define a discontinuity in both a 2D pattern formed on said calibration board and the 3D relief of said board.

In embodiments, a calibration board is provided comprising at least one common feature, wherein said common feature is selected from lines, points or shapes which correspond to a discontinuity both a 2D pattern formed on said calibration board and the 3D relief of said board.

In one embodiment, said common features comprise a plurality of common points, wherein said common points are provided where there is both a discontinuity in the gradients of lines in the 2D image on the calibration board and a point discontinuity in the relief of the calibration board.

In one embodiment, the points are provided at corners in lines, said lines being lines in the 2D image and defining discontinuities in the relief of the calibration board. Said lines may be part of a closed shape said closed shape being provided recessed or protruding from said calibration board. In some embodiments, the closed shapes may have a varying profile with respect to the calibration board such that some parts are recessed and other parts are protruding from the calibration board. The shapes may be polygons or have one or more curved sides, providing that at least one corner is formed which is distinguishable in a 2D image of the board and in the 3D relief of the board.

In a further embodiment, the discontinuity in gradient is formed in a line which is not part of a closed shape, for example, the line may extend to the edge of the calibration board or be open in some other way.

In a further embodiment, shapes comprising said corners are cut from the board, such that there is a hole in the board, the boundary of said hole on said calibration board comprising a line with a discontinuity in the gradient of the line as measured along the line in the plane of the calibration board.

In a further embodiment, common features are lines which form edges in the 3D relief of the board. The lines may simply be formed by cutting corners from the board.

In one embodiment, the calibration board has a chessboard pattern with some squares removed. The calibration board comprises a 2D pattern, said pattern may comprise two or more colours.

In further embodiments, the pattern has 2 or more levels of relief and map provide a step-like relief pattern on said calibration board.

In a further embodiment, a method for aligning image data captured using two sensors is provided, wherein at least one of the sensors capture data related to 3D image data, the method comprising:

providing a calibration board, said calibration board comprises at least one feature, wherein said at least one feature is selected from lines, points or shapes which define a discontinuity in both a 2D pattern formed on said calibration board and the 3D relief of said board, locating said at least one feature in the image data from the first and second sensors and aligning the data from the first and second sensors.

In a further embodiment, 3 or more sensors are provided.

In a yet further embodiment, one sensor is a depth sensor. For example a time of flight sensor or a depth sensor which comprises a projector configured to project a pattern on said scene and a camera configured to capture an image of said pattern projected onto the scene. The other sensor may be a standard camera either a video camera or a still camera.

Embodiments of the present invention can be implemented either in hardware or on software in a general purpose computer. Further embodiments of the present invention can be implemented in a combination of hardware and software. Embodiments of the present invention can also be implemented by a single processing apparatus or a distributed network of processing apparatus.

Since the embodiments of the present invention can be implemented by software, embodiments of the present invention encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

A system and method in accordance with a first embodiment will now be described.

FIG. 1 is a schematic of a system in accordance with an embodiment of the present invention used to image object 1. The object is illuminated by three different light sources 3, 5 and 7. In this embodiment, the three different light sources are capable of emitting radiation of three different colours. Here, the colours red, green and blue are selected as it is possible to obtain video cameras which can distinguish between these three colours. However, it is possible to use any three lights which can emit colours which can be distinguished between by a video camera. It is also possible to use lights which emit radiation in the non-optical radiation bands. The exact shade of colour or frequency of radiation chosen is dependent on the video camera. In one embodiment, the lights are projectors and filters are provided so that the scene is illuminated with radiation of a particular colour from each projector. In a further embodiment, LEDs are used to illuminate the object.

In an embodiment, the lights are adjusted to the frequency captured by the sensors within the camera so that each sensor can capture the colour in the range of 0 to 255. If colours outside this range are determined, then saturation can occur and this can cause errors in the generated 3-D image.

In this embodiment, the system is either provided indoors or outside in the dark to minimise background radiation affecting the data. The three lights 3, 5 and 7 are arranged laterally around the object 1 and are vertically positioned at levels between floor level to the height of the object 1. In one embodiment, the lights 3, 5, 7 are provided in a triangular arrangement. In one arrangement, the lights provided in a triangle will have a separation of between 1 to 3 m between adjacent lights, in a further arrangement between 1.5 to 2.5 m between adjacent lights. The lights are directed towards the object 1.

The angular separation between the three light sources 3, 5 and 7 is approximately 30 degrees in the plane of rotation about the object 1. Greater angular separation can make orientation dependent colour changes more apparent. However, if the light sources are too far apart, concave shapes in the object 1 are more difficult to distinguish since shadows cast by such shapes will extend over larger portions of the object making data analysis more difficult. In a preferred arrangement each part of the object 1 is illuminated by all three light sources 3, 5 and 7.

Camera 9 which is positioned vertically below second light source 5 is used to record the object as it moves while being illuminated by the three lights 3, 5 and 7. When the lights are arranged in a triangle, in one embodiment, the camera 9 may be placed in the plane of the triangle and within the triangle.

The camera 9 will have the ability to isolate between images of different colours. This may be achieved by a filter mechanism within the camera. Therefore, the camera 9 can capture an image of the object 1 using the illumination from all three light sources and will also be able to distinguish between the reflected radiation from each light source in turn. Therefore, it is possible to produce an image using the reflected radiation from the red light source, the green light source and the blue light source separately.

In one embodiment, the first video camera outputs raw image data. There is no compression for example due to MPEG or other data compression mechanism used. Compression of the image data can give rise to artefacts which manifest themselves in the reconstructed 3-D image.

The arrangement of FIG. 1 also comprises a second camera 11. The first camera 9 is used to collect the photometric stereo data. The first and second cameras together are used to collect two view stereo data. If the lights are arranged in a triangle, both the first camera 9 and the second camera 11 will be provided within the triangle. In one embodiment, there is a separation between 0.25 and 1 m between the two cameras. In a further arrangement, there is approximately 0.5 m between the two cameras.

When collecting two view stereo data, the cameras 9 and 11 do not attempt to distinguish between light received from the different light sources 3, 5, 7. Capturing 3-D images using two cameras is well known and is generally referred to as two view stereo and will not be described further here.

The data captured by cameras 9 and 11 is provided to analysis unit 13. Analysis unit 13 is also connected to the three light sources 3, 5 and 7. Analysis unit 13 performs the function of a correlation unit adapted to correlate data received from the first 9 and second 11 cameras.

Figure 2:
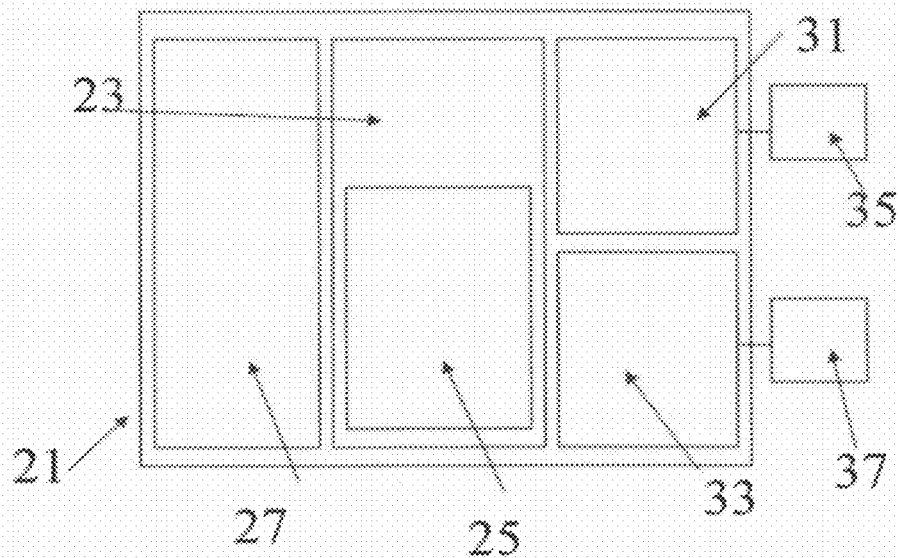
FIG. 2 is a diagram of an analysis unit which is used in the system of FIG. 1.

FIG. 2 shows a possible basic architecture a system analysis unit. The analysis unit 13 comprises a processor 23 which executes a program 25. Analysis unit 13 further comprises storage 27. The storage 27 stores data which is used by program 25 to analyse the data received from the two cameras 9, 11 of FIG. 1 and control illumination by the lights 3, 5 and 7. The analysis unit 13 further comprises an input module 11 and an output module 33. The input module 31 is connected to a camera input 35. Camera input 35 receives camera data from the two cameras 9 and 11. The camera input 35 may simply receive data directly from the cameras or alternatively, camera input 35 may receive camera data from an external storage medium or a network.

Connected to the output module 33 is a display 37. The display 37 is used for displaying captured 3D images generated from the camera data received by the camera input 35. Instead of a display 27, the output module 33 may output to a file or over the internet etc.

In use, the analysis unit 13 receives camera data through camera input 33. The program 25 executed on processor 23 analyses the camera data using data stored in the storage 27 to produce 3D image data. The data is output via the output module 35 to display 37.

Figure 3:
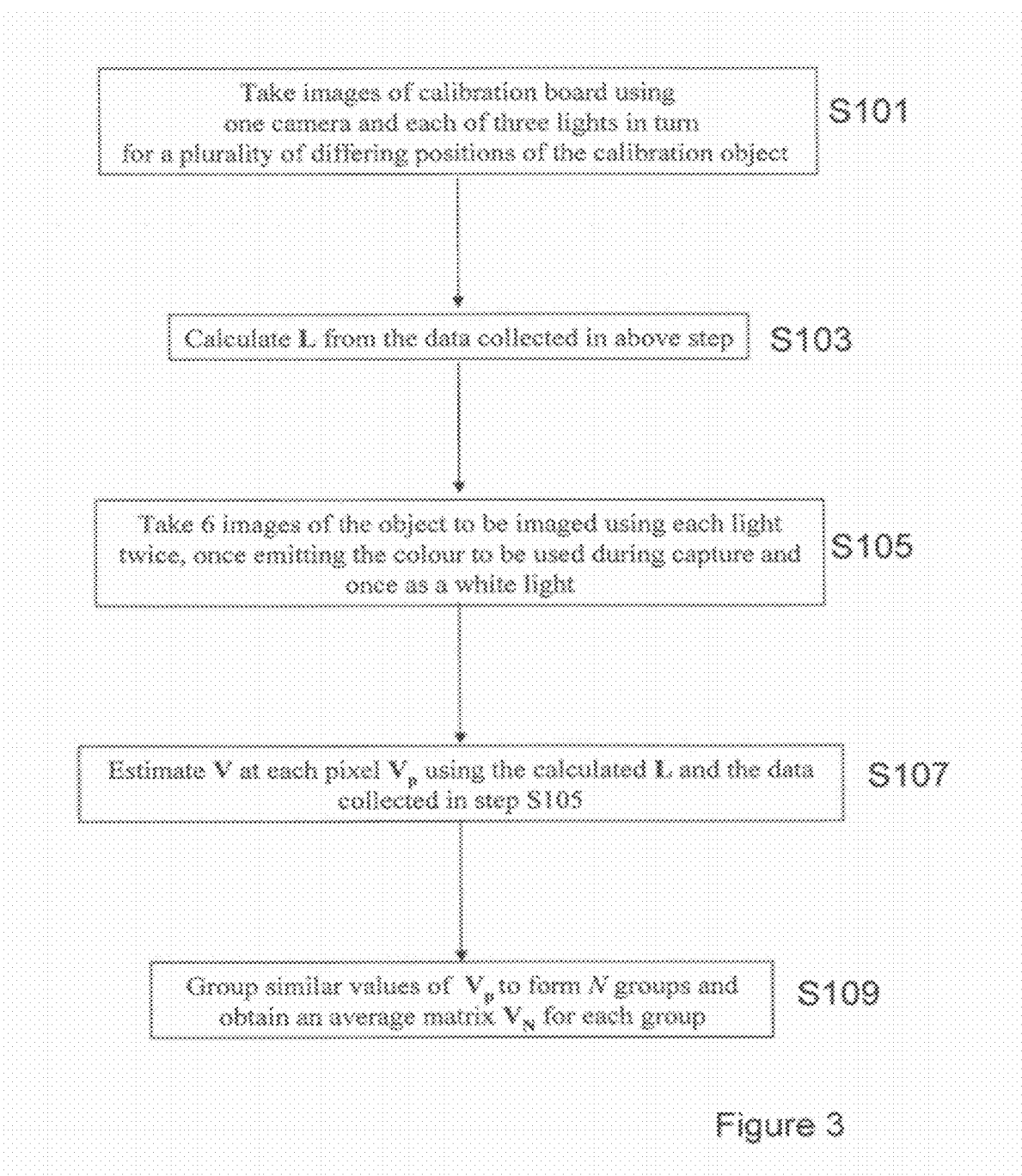
FIG. 3 is a flow diagram of a calibration method in accordance with an embodiment present invention.

First, a calibration method will be described with reference to the flow chart of FIG. 3. In step S101, images of a calibration board are taken using one camera and each of the three lights in turn for a plurality of differing positions of the calibration object.

The method (both calibration and reconstruction) assumes a Lambertian reflectance model. Referring to FIG. 1, a light source 3 with direction $l_i$ and spectral distribution $S_i(\lambda)$ illuminating a surface 1 with spectral reflectance function $\rho(\lambda)$ and unit normal $\hat{n}$, the observed intensity $c_j$ by a sensor 9 with spectral sensitivity $u_j(\lambda)$ is given by $$c_j = l_i^T \hat{n} \int S_i(\lambda) \rho(\lambda) u_j(\lambda) d\lambda = \alpha v_{ij} l_i^T \hat{n}, \quad (1)$$

where $\alpha v_{ij} = \int S_i(\lambda) \rho(\lambda) u_j(\lambda) d\lambda$ and $v_{ij}$ takes into account the chromaticity of the surface, the incident light colour and the spectral sensitivity of the sensor while $\alpha$ defines the albedo of the surface. This means that for a monochromatic scene $v_{ij}$ is constant across a scene even if the surface's albedo varies. To capture a 3D image, it is important to derive the direction of the surface normals and their magnitude if of less interest. Therefore, the albedo scaled normal $n = \alpha \hat{n}$ is used for compactness as $\hat{n}$ can be recovered from this by renormalizing.

Given the three lights 3, 5, 7 of FIG. 1 illuminating a scene, the resulting RGB image $c = [c_0 \ c_1 \ c_2]^T$ is given by $$c = [v_0 v_1 v_2][l_0 l_1 l_2]^T n = VLn, \quad (2)$$

where $v_i = [v_{0j} \ v_{1j} \ v_{2j}]^T$ and represents the combined response of surface 1 and sensor 9 to light j.

Given a new input image, a normal map can be reconstructed using $$n = (VL)^{-1} c, \quad (3)$$

provided that both L and V are invertible. L will be invertible if the three light sources 3, 5, 7 used are not collinear. In the theoretical case that each sensor 9 in the camera only responds to one of the lights 3, 5, 7. V will be diagonal and therefore also invertible. However, in practice there is cross talk between the different channels in the sensor and the lights as their spectral distributions overlap.

Using a red, a green and a blue light results in a V matrix with large values along the leading diagonal and smaller values elsewhere due to crosstalk. This results in V being well conditioned for inversion. Calibrating the photometric system then reduces to estimating L and V although V will vary for surfaces of different chromaticity.

To estimate L in step S103, the data from a calibration board which is imaged at several arbitrary orientations with each light switched on in turn is used as captured in step S101. The normal to the board (which is known) is then used.

This provides a set of (c, n) pairs which allows L to be estimated up to a scale factor for each row. Since L only defines directions, this scale factor can be ignored. This stage also allows the relative positions of the cameras to be calculated, calibrating the multiview stereo part of the algorithm.

Figure 5:
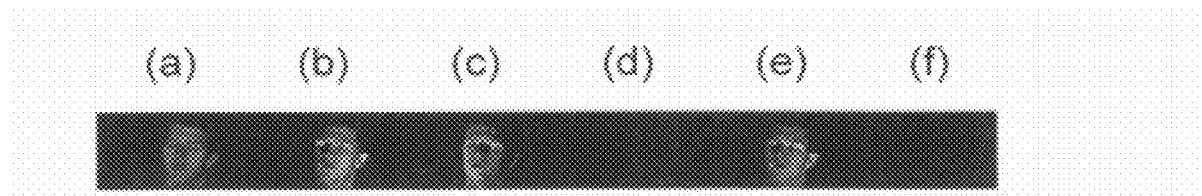
FIGS. 5(a) to (f) are images obtained using a calibration procedure explained with reference to FIG. 3.

Estimating V is a more complex problem since it depends upon the material properties of the scene and varies for surfaces with different chromaticities. FIG. 5 shows six images $I_{w1}, I_{w2}, I_{w3}, I_{c1}, I_{c2}, I_{c3}$ which are used for calibration of V. These images are captured in step S105.

It is assumed that scene geometry is constant for each of the 6 images. Each light is switched on in turn once as white and once as the colour it will use in the capture. The three images under white illumination, $I_{w1}, I_{w2}, I_{w3}$, combined with the already calculated lighting directions allow for standard photometric stereo, to produce a normal map with a value of n at each pixel. This map will contain estimates at all pixels except those that are either shadowed or exhibit specular reflection in any input image, which are detected by thresholding.

Each of the next three images, $I_{c1}$; $I_{c2}$; $I_{c3}$, allows for an estimate of one column of the V matrix to be made at each pixel. For example using $I_{c1}$ when only the first light is on equation (2) reduces to $$c=[v_0 v_1 v_2][l_0 0 0]^T n = v_0(l_0^T n). \qquad (4)$$

Since c, n and $l_0$ are known, this allows all elements of $v_0$ to be calculated.

In the above embodiment, V is estimated at each pixel at step S107. This allows multispectral photometric stereo to be extended to multichromatic scenes.

Once an individual calibration matrix has been estimated for each pixel in a calibration image, N calibration matrices are determined that best describe the N most dominant colours present in the calibration scene.

In one embodiment, this is done using a RANSAC based approach in step S109. Here, one of the calculated matrices is chosen at random as a hypothesis and the number of pixels in the calibration scene that support it is observed. To measure support for a hypothesis an image under full lighting $I_f$ is synthesized according to $I_f = I_{c1} + I_{c2} + I_{c3}$.

Therefore, using equation (2), the same image is generated using the hypothesized matrix Vp along with the already calculated normal map and lighting directions, n and L. A pixel supports the hypothesized matrix Vp if it's value in the two synthesized images is sufficiently similar, mathematically if $$|c_f - (V_p L) n| < \tau, \qquad (5)$$

where $\tau$ is a threshold value and $c_f$ is the pixel value from $I_f$.

This is repeated a fixed number of times retaining the hypothesis with most support each time. The final calibration matrix is then found by averaging V over all the pixels that supported the final hypothesis. Once the first calibration matrix has been chosen, all pixels that supported it are removed and the process is repeated to find the next most dominant chromaticity in the scene. This is repeated until N calibration matrices have been recovered, where N is given as input.

Figure 4:
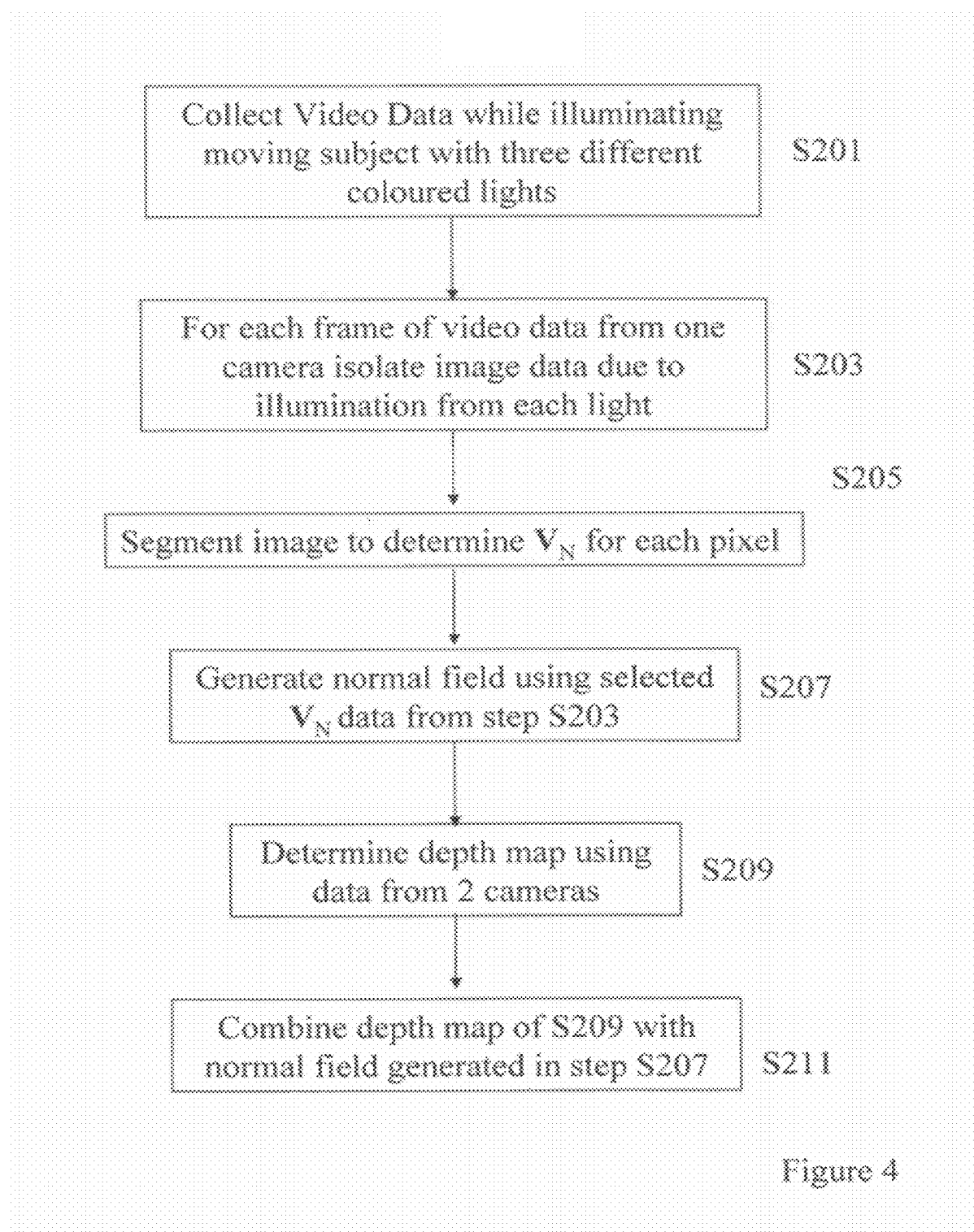
FIG. 4 is a flow diagram of a reconstruction method in accordance with an embodiment of the present invention.

The reconstruction of a 3D image will now be described with reference to FIG. 4. The image of a scene is reconstructed by obtaining video data of the scene over time while illuminating the scene with three different coloured lights in step S201. The data is processed in the same way as described for calibration and for each frame of video data, the data due to illumination from each camera is determined. This allows c to be obtained for each pixel.

Next the image is segmented in step S205 to decide which calibration matrix to use at each pixel. In this embodiment, the segmentation is set up in a Markov Random Field (MRF) framework with unary and pairwise terms described below. There is one node for each pixel that is not shadowed in the input image and edges are added between nodes corresponding to neighbouring pixels within a 4-neighborhood.

A depth map from the stereo reconstruction is smoothed and a normal $n_s$ at each pixel is calculated from it. The input image is smoothed by the same amount to give a smoothed image value $c_s$ at each pixel and the unary term for using matrix $V_i$ is given by $$|c_s - (V_i L) n_s|^2. \qquad (6)$$

This encourages calibration matrices to be chosen which produce a normal map with similar low frequency characteristics to the recovered stereo field.

In an embodiment, the Potts model for the pairwise terms is used. Here, no cost is assigned to neighbouring pixels sharing a label and a cost $\gamma$ is assigned if they have different labels. The cost $\gamma$ is modulated by an edge map of the input image found by Sobel filtering and thresholding. For pixels not on an edge $\gamma$ is large while for pixels on an edge $\gamma$ is smaller.

In an embodiment, the maximum a posteriori (MAP) solution to the MRF is estimated using a tree reweighted message passing algorithm and reconstruction is based upon the labels assigned. At the boundaries between two regions mixed pixels may occur and any slight errors in segmentation may result in visible artefacts. To at least partially mitigate this, in the band one pixel either side of a region boundary, normals are interpolated perpendicular to the boundary.

A method in accordance with the above procedure produces a normal field in step S207 which gives very accurate high frequency information but since it must be integrated to form a surface, small calibration errors or deviations of the scene from the assumed model may lead to large low frequency errors.

To provide more accurate low frequency measurements, in methods in accordance with this embodiment use a two view stereo system using the data from cameras 9 and 11 to reconstruct coarse geometry at each frame in step S209. Any multiview stereo algorithm could be used at this stage. In methods in accordance with one embodiment, an algorithm is chosen which provides robustness whilst not attempting to recover fine detail as this will be recovered by the photometric stereo. In one case, a sum of squared differences (SSD) matching of 7×7 windows was used. Normalized cross correlation (NCC) could also be used.

Once a stereo depth map has been estimated in step S209, the high frequency detail in the normal field obtained in step S207 with the low frequency information in the depth map of step S209 is combined in step S211.

To remove low frequency bias from the normal field a smoothed version is created by blurring the normal map with a Gaussian of variance $\sigma^2$ and renormalizing. The rotation between each normal from this smooth field to the original normal field is noted and is then applied, on a per pixel basis, to a normal field calculated from a version of the stereo depth map smoothed by the same amount.

By changing the variance $\sigma^2$ the cut off frequency below which information from the normal field is replaced by information from the stereo depth map can be modified. In an embodiment, to obtain a surface from the resulting normal field an energy minimization approach is used, which ensures the overall shape is consistent with the depth map while the high frequency detail is dictated by the modified normal map.

Figure 6:
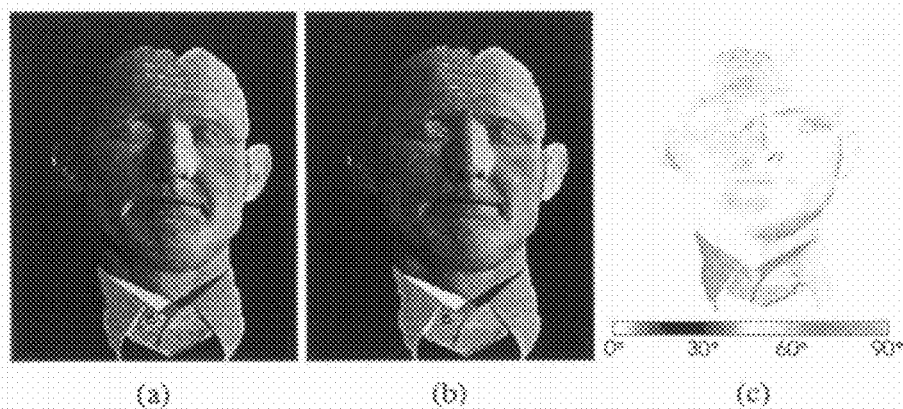
FIG. 6(a) is a normal map obtained using the method explained with reference to FIG. 4.
FIG. 6(b) is a normal map obtained using a method without varying chromaticity is and FIG. 6(c) shows the difference between FIGS. 6(a) and 6(b)

To demonstrate the above technique, FIG. 6(a) shows a normal map constructed using the above technique, FIG. 6(b) shows a normal map without using the final step of combining with a depth map and FIG. 6(c) difference in degrees between the two normal maps.

Figure 7:
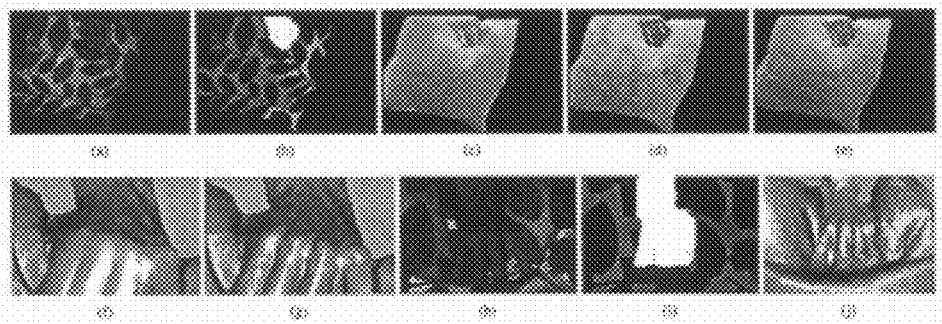
FIGS. 7(a) to (j) show reconstruction of multi-chromatic seems using the method described with relation to FIGS. 3 and 4.

To demonstrate the above technique on a multichromatic scene, a challenging sequence involving a green and white cushion was processed. Calibration was performed with N=3 and an input image and the resulting segmentation are shown in FIG. 7.

FIG. 7(a) shows the input image. FIG. 7(b) shows segmentation as described with reference to step S205. FIG.

7(c) shows smoothed depth normals obtained in step S207. FIG. 7(d) shows normals estimated using single calibration matrix. FIG. 7(e) shows normals estimated using 3 calibration matrices. FIG. 7(f) shows reconstruction using single calibration matrix. FIG. 7(g) shows reconstruction using 3 calibration matrices. FIG. 7(h) shows an input image upon which segmentation failed. FIG. 7(i) shows failed segmentation. FIG. 7(j) shows reconstruction after failed segmentation.

While segmentation around the pattern on the cushion is accurate, that around the hand is not exact. The folds around the hand are at the limit of the detail that our stereo algorithm resolves and hence segmentation based on the resulting normals can prove noisy. Smoothed normals from the stereo algorithm are given in FIG. 7(c) for comparison with normal maps recovered using a single calibration matrix for the scene, FIG. 7(d), and using three calibration matrices, FIG. 7(e). If only one calibration matrix is used for the entire scene the hand is recovered incorrectly, FIG. 7(f), whilst using our new technique normals and hence geometry are correctly estimated, FIG. 7(g).

The images shown in FIG. 7 are two frames from a 300 frame sequence. In the vast majority of frames, segmentation is generally accurate enough to give qualitatively good results. For a few frames such as that in FIG. 7(h) segmentation fails due to strong shadowing, here failing to segment the ends of the fingers correctly. The resulting geometry produced, 7(j), exhibits artefacts but this failure is a rare occurrence. One reconstructed frame can be seen in FIG. 8.

The proposed capture system is designed for use with dynamic scenes, computing geometry independently for every frame of input. Several sequences were captured to demonstrate the robustness of the system and the quality of its results. Several stills of sequences are shown in FIG. 8.

Figure 8:
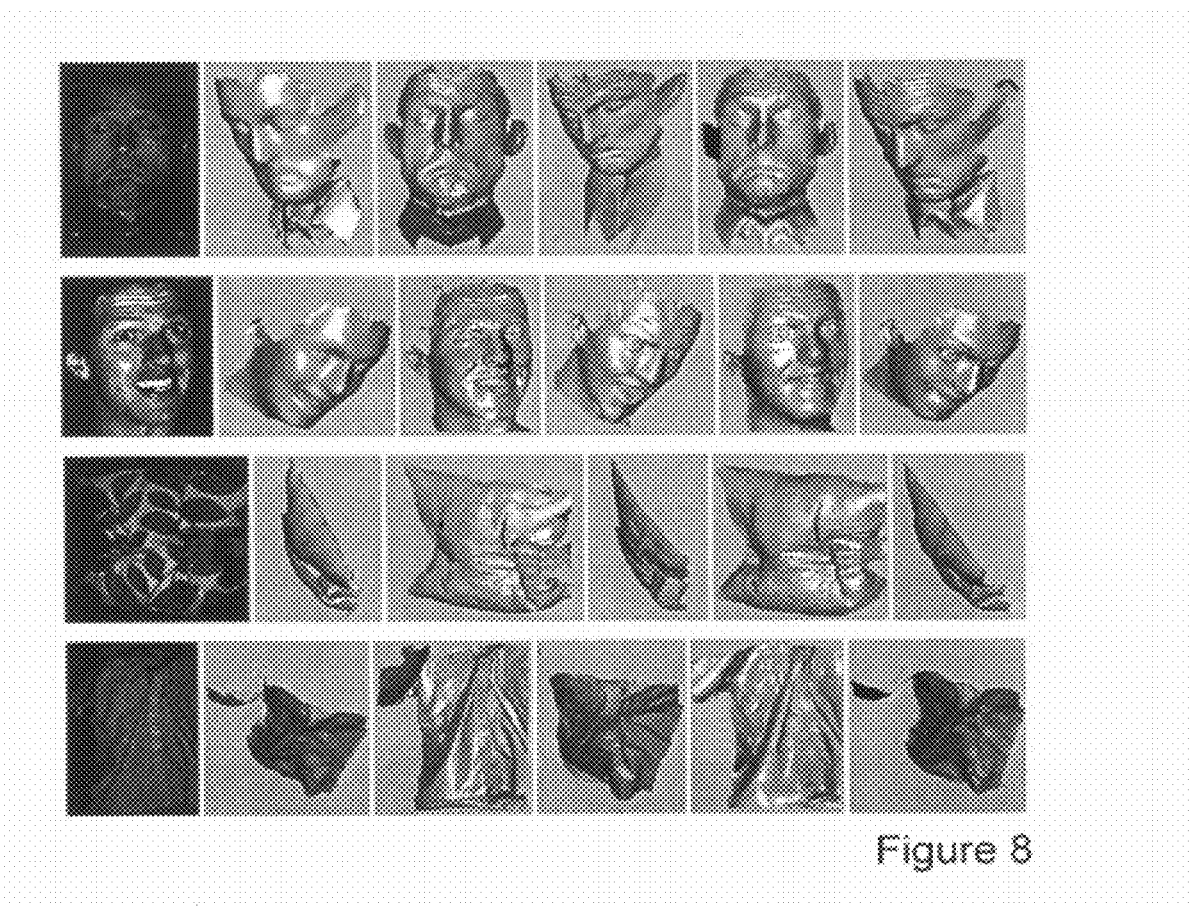
FIG. 8 shows reconstructions of scenes using the methods described with relation to FIGS. 3 and 4.

In FIG. 8, from left to right in each row: Input image, stereo reconstruction, integrated normal field, novel view of integrated normal field, final result once stereo information included, same novel view of final result. While integrating the normal field gives reasonable results when viewed frontally low frequency deformations are visible when viewed from novel angles. These deformations are removed in the final result using low frequency information from stereo.

The stereo results shown in the second column contain very little detail but give correct overall geometry. The second and third columns show results comparable to those achieved by purely photometric systems such as which look convincing when viewed from close to the original direction but contain low frequency deformations that become apparent when rendered from novel viewpoints.

The combined results in the final two columns demonstrate that this low frequency deformation has been removed while retaining high frequency detail. There is also much less temporal flicker visible in the combined results than in the pure stereo results as medium frequencies from the photometric normal maps are included.

The image size for these sequences was 1600×1200 and the complete algorithm's running time was on average 16 seconds per frame, the two most time consuming parts being the stereo reconstruction which takes 4 seconds implemented in CUDA and the integration of each normal field to a surface which takes 9 seconds using single threaded C++.

Figure 10:
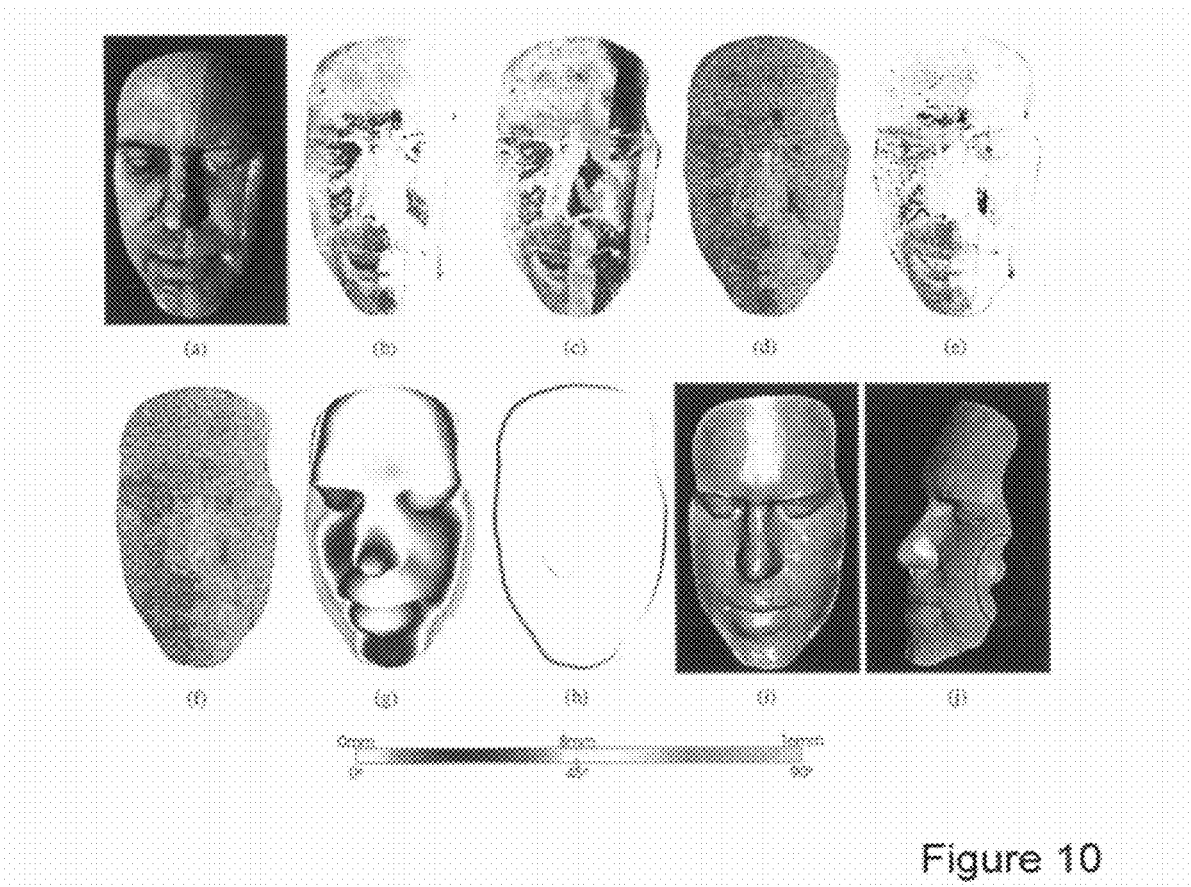
FIGS. 10(a) to (j) show a quantitative analysis on a known rendered image.

In order to demonstrate the accuracy of the approach against ground truth data a set of experiments on synthetic images was carried out. A publicly available high resolution model was rendered in OpenGL. A recorded diffuse albedo recorded by external sources was applied to half of the model and the other half was rendered using three different solid colours. A uniform white specular albedo was present over the entire model. An example input image is shown in FIG. 10(a). Calibration was performed by rendering a target board and estimating camera and light positions from this.

Initially no noise was added to the images and reconstruction was carried out. The errors between ground truth normals and recovered normals are shown in FIG. 10(b). In the areas of uniform chromaticity the only errors that occur are due to specular reflections while in the natural half there is a varying level of error introduced by the varying chromaticity, most notably around the beard and lips. Some error does occur at the boundaries between the regions of distinct chromaticity due to the two pixel border over which normals are interpolated.

Calibration was also carried out using a photometric stereo method assuming one calibration matrix with resulting normal errors shown in FIG. 10(c). This approach estimates the correct calibration for the natural portion of the model, producing very similar results to the methods of the current embodiment. However, it cannot deal with the multiple chroinaticities in the scene.

In a natural image there will be some sensor noise, and this was simulated by adding Gaussian noise with a standard deviation of 6 independently to each colour channel of each pixel. This noise is transferred to the normals and results in the errors shown in FIG. 10(d).

While the above results indicate that high frequency detail is being recovered by the photometric stereo, it gives no information about low frequency errors. If the recovered normal field is integrated then there is a large discrepancy between recovered depth and ground truth values as shown in FIG. 10(g). Combining the depth map estimated using stereo with the normal maps greatly reduces this error as shown in FIG. 10(h). There are however still some appreciable errors at the sides of the face, highlighted in FIG. 10(j), which are not front and parallel to the camera. Adding more cameras to the system would help to resolve this problem but at the expense of increased system complexity.

Introducing the low frequency information from the stereo reconstruction also helps to improve the normal accuracy slightly. This improvement was mostly due to reducing errors caused by specularities which are consistent across small regions. Error maps are shown in FIGS. 10(e) and 10(f) where it can be seen that slight artefacts are introduced by the smoothing in the stereo data, however these are very hard to see upon reconstruction, FIG. 10(i). Numerical results for depth and normal errors are given in table 1.

TABLE 1

|  | No noise on data | | Noise with $\sigma = 6$ | |
| --- | --- | --- | --- | --- |
|  | Normals only | Normals with stereo | Normals only | Normals with stereo |
| Mean absolute normal error (°) | 3.97 | 3.26 | 9.01 | 8.38 |
| Normal error standard deviation (°) | 5.23 | 4.07 | 6.04 | 5.63 |
| Mean absolute depth error (mm) | 6.83 | 0.37 | 6.88 | 0.39 |
| Depth error standard deviation (mm) | 5.49 | 1.23 | 5.54 | 1.27 |

Table 1. Numeric errors on ground truth data

Figure 9:
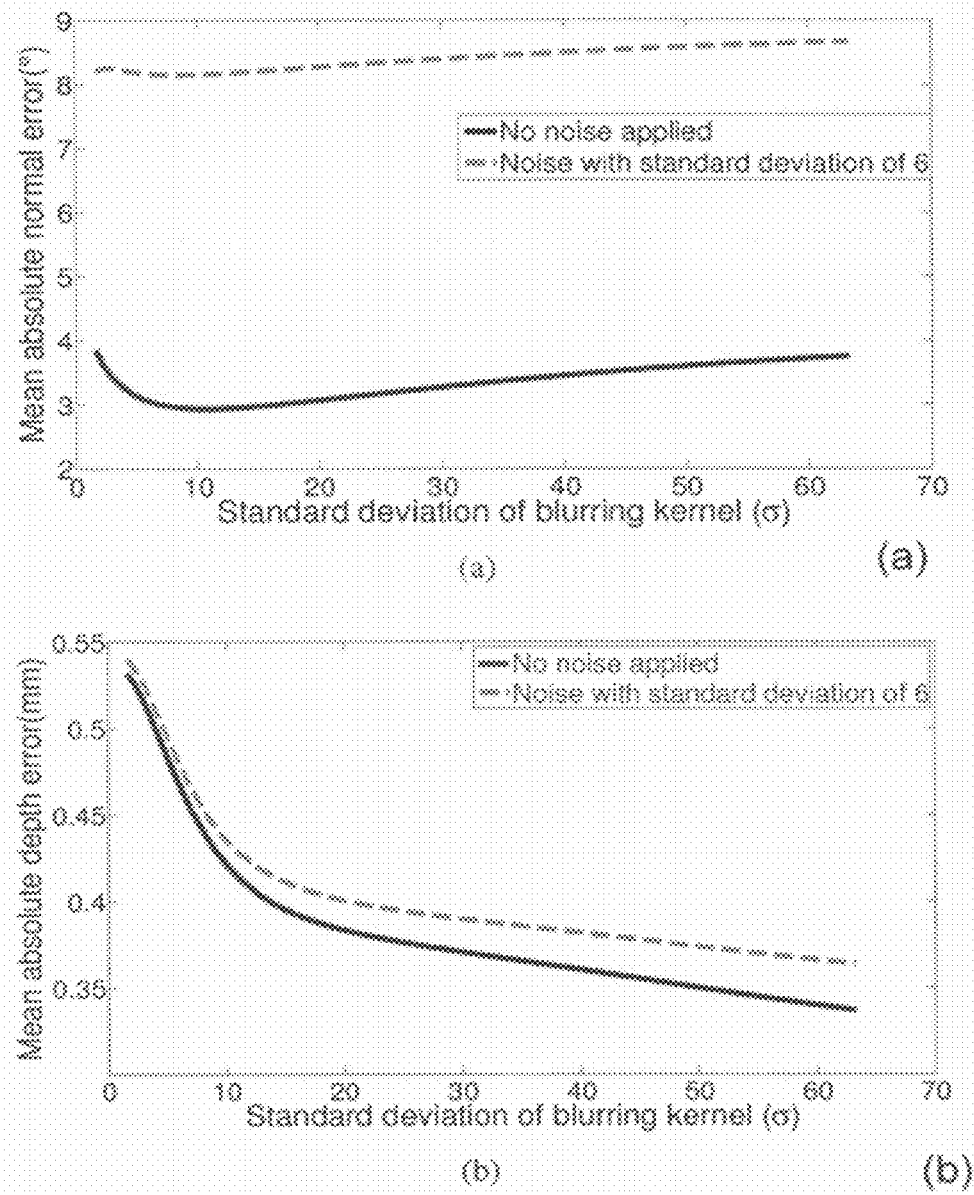
FIG. 9(a) shows the effect of noise applied to the normal errors using the method of FIG. 4
FIG. 9(b) shows the effect of noise on depth errors.

The effect of changing the cutoff frequency between photometric information and stereo information was investigated by altering the variance, $\sigma^2$, of the blurring kernel used. FIGS. 9a and 9b show the effect of changing this parameter upon reconstruction errors. FIG. 9(a) shows the effect of $\sigma$ on normal errors and FIG. 9(b) shows the effect of a on depth errors. Increasing $\sigma$ results in a greater frequency range being used from the photometric normal map instead of the stereo depth map.

When $\sigma$ is very small, giving a high cut off frequency, the high frequency information in the normal field is lost and large normal errors occur. As $\sigma$ is increased, an optimum is reached where the low frequency stereo removes any low frequency bias in the normal field without overly smoothing the detail. Beyond this point the error slowly increases back towards the value for the normal field on its own.

Conversely to what might be expected increasing $\sigma$ also reduces depth errors slightly. This is because the overall shape, and hence the very low frequency component, is constrained through the integration method and it is mid range frequencies that are being taken from the photometric normal field instead of the stereo depth map. Since the stereo reconstruction is only based on two views, being accurate to sub pixel levels is very hard and hence there is some medium frequency error present which the normal field can correct. This is particularly important when reconstructing dynamic scenes as the medium frequency errors manifest themselves as flickering of the surface between subsequent frames. In practice on real sequences a value of $\sigma$ of around 30 has been sufficient to reduce this temporal flicker.

In the methods and systems in accordance with the embodiments, a multispectral photometric stereo method is presented for capturing high resolution geometry of rapidly deforming surfaces. Further, a novel calibration technique is demonstrated which allows photometric calibration upon a wider range of objects than previous techniques, extending multispectral photometric stereo to scenes containing multiple chromaticities. Low frequency information is provided by a two-view stereo system, without the need for markers. The above method and systems can be used for 3D capture of challenging sequences, focusing on faces and deforming cloth and using only two cameras and three light sources. In the above methods, low frequency bias is removed from the photometric results whilst maintaining a high level of detail.

The methods and systems in accordance with the above embodiments use multispectral photometric stereo with three different coloured lights to capture three lighting directions in a single RGB image. This allows photometric stereo to be carried out on each frame of a video sequence, generating high resolution geometry at the same frame rate as the input video. The above methods and systems do not requires the use of markers or other artefacts applied to the objects to be reconstructed. Further, the methods and systems can be applied to the capture of real time multichromatic scenes. Methods in accordance with embodiments of the present invention allow calibration of a multispectral photometric stereo setup by estimating photometric properties for all surfaces in a calibration scene. Further, this calibration allows multispectral photometric stereo to be applied to scenes containing multiple chromaticities.

Systems and methods in accordance with the present invention allow high quality results to be achieved with as little as two cameras and three passive light sources. Next a method in accordance with a further embodiment of the present invention will be described.

A system in accordance with an embodiment of the present invention uses the same hardware as described with reference to FIGS. 1 and 2. Therefore, to avoid any unnecessary repetition, like reference numerals will be used to denote like features.

As for the method described with reference to the first embodiment, the method described in relation to this embodiment can also cope with the object which has multiple colours. The method of this embodiment is similar to that described in relation to the previous embodiment, the input image is segmented into regions of constant chromaticity before normal estimation is performed.

Figure 11:
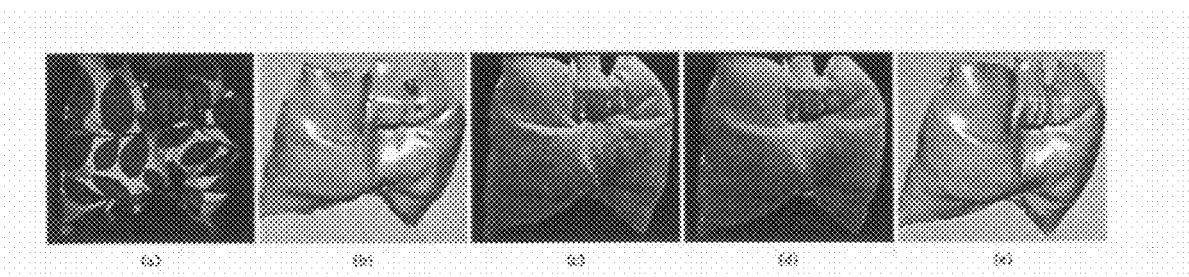
FIG. 11(a) shows an image to be reconstructed and FIGS. 11(b) to (e) shows reconstructions of the image FIG. 11(a)

FIG. 11a shows an input image which is to be reconstructed. FIG. 11b shows low resolution geometry recovered from two-view stereo. This is obtained using the two cameras shown in FIG. 1. FIG. 11c shows a normal map estimated assuming constant chromaticity. FIG. 11d shows a normal map estimated using the method which will be described in accordance with the following embodiment. FIG. 11e shows high-quality geometry obtained by combining the stereo image of FIG. 11b with the normal map of FIG. 11d.

Figure 12:
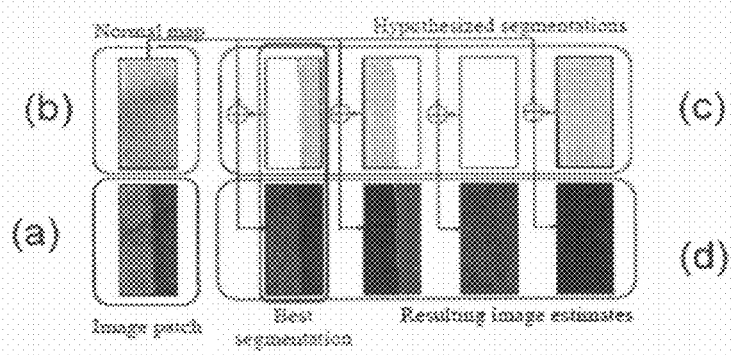
FIG. 12(a) shows an input image with two colours.
FIG. 12(b) shows the normal map the input image.
FIG. 12(c) shows various hypothesised segmentations and FIG. 12(d) shows resulting images using the hypothesised segmentations of FIG. 12(c)

However, in the method in accordance with this further embodiment, a low resolution stereo depth map is constructed to compute a smoothed normal direction at each pixel. The low resolution stereo depth map is constructed using the two cameras 9, 11 (FIG. 1). It is assumed that there are N chromaticities in the scene. For each of the N chromaticities in the scene, the smoothed normal at any pixel will predict a different colour. This is shown for example in FIG. 12. FIG. 12a shows a patch invention which contains two colours. The corresponding normal map of the image is shown in FIG. 12b. FIG. 12c shows possible hypothesised segmentations. FIG. 12d shows the resulting image estimate following the segmentations used in FIG. 12c.

A good segmentation can be found by ensuring that an image generated from the smoothed normals matches the observed image as closely as possible. In this embodiment, two constraints are enforced during the segmentation process:
1. The likelihood of generating the observed image and smoothed normal map is maximized.
2. Chromaticity is locally constant.

To enforce the first constraint, a likelihood term is derived. In this embodiment, a Markov Random Field (MRF) is employed to perform segmentation whilst enforcing the second constraint.

Figure 13:
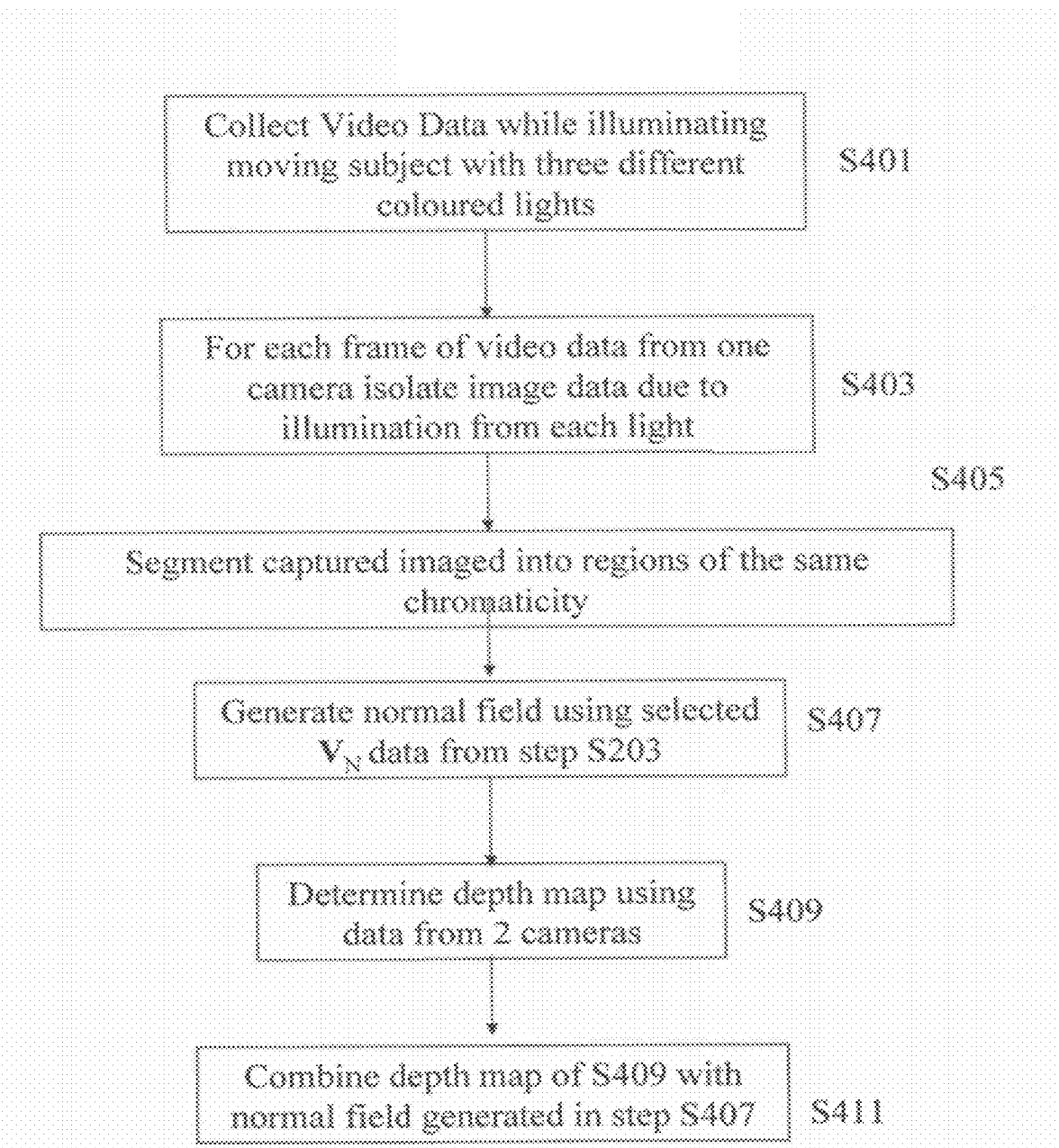
FIG. 13 is a flow diagram showing a reconstruction method in accordance with a further embodiment of the present invention.

FIG. 13 is a flow chart showing the steps necessary to reconstruct a 3-D image using a method in accordance with an embodiment of the present invention.

As for the first embodiment, video data is collected in step S401 while illuminating a moving subject or object with three different coloured lights. In step SS403, for each frame of video data from one camera, isolate image data due to illumination from each light.

Using a Lambertian Reflectance Model and assuming that there is no ambient lighting, given three distant point light sources illuminating a surface with unit normal n and albedo $\alpha$, the observed intensity of the surface is given by:

$$c = \alpha V L n = [v_0 v_1 v_2][l_0 l_1 l_2]^T \alpha n, \quad (7)$$

where c, $l_i$ and $v_i$ are all column vectors of length three. C denotes the RGB image intensity, $l_i$ defines the direction of light i and $v_i$ is the combined response of surface and sensor to light i.

The matrix V models the combination of the surface's chromaticity, the lights' spectral distributions and the camera sensors' spectral sensitivities. It is this matrix that varies for regions of different chromaticity. The albedo of the surface α is a value between zero and one which is equal to the proportion of incoming light reflected by the surface. In this embodiment, it is assumed that each channel of the image is corrupted by additive white Gaussian noise with variance $\sigma^2$ at each pixel independently, making c normally distributed with:

$$P(c|n,V,\alpha) = \mathcal{N}(c|\alpha VLn, \sigma^2 I). \quad (8)$$

Given an observed image value c and an estimate of V and L the maximum likelihood estimate of n is then given by $$n = \frac{(VL)^{-1}c}{|(VL)^{-1}c|}. \quad (9)$$

The likelihood of observing an image and normal pair (c, n) given a chromaticity defined by the matrix V can be found using Bayes' rule as $$P(c,n|V) = P(c|n,V)P(n|V). \quad (10)$$

In this embodiment, a uniform prior is assumed for the surface normals $P(n|V)$. $P(c|n,V)$ cannot be expressed without taking the surface's albedo α into account. Since this is unknown it can be marginalize out, giving $$P(c \mid n, V) = \int P(c, \alpha \mid n, V) d\alpha \quad (11)$$

$$= \int P(c \mid n, V, \alpha) P(\alpha \mid n, V) d\alpha.$$

In this embodiment, the prior $P(\alpha|n,V)$ to be uniform in the range zero to one. Using (x) this gives $$P(c \mid n, V) = \int_0^1 \mathcal{N}(c \mid \alpha VLn, \sigma^2 I) d\alpha. \quad (12)$$

By choosing a coordinate system such that the x-axis of this new coordinate system is parallel to the line VLn this can be written as $$P(c \mid n, V) = \int_0^1 \mathcal{N}\left(c_r \left| \begin{bmatrix} |\alpha VLn| \\ 0 \\ 0 \end{bmatrix} \right., \sigma^2 I \right) d\alpha, \quad (13)$$

where $c_r = [c_{r0}\ c_{r1}\ c_{r2}]^T$ is c in the new rotated coordinate system. Removing all terms that do not depend on a from the integral and using $b = |VLn|$ for compactness gives $$\mathcal{N}\left(\begin{bmatrix} c_{r1} \\ c_{r2} \end{bmatrix} \left| \begin{bmatrix} 0 \\ 0 \end{bmatrix} \right., \sigma^2 I\right) \frac{1}{b} \int_0^1 \mathcal{N}\left(\alpha \left| \frac{c_{r0}}{b}, \left(\frac{\sigma}{b}\right)^2 \right.\right) d\alpha, \quad (14)$$

which can be integrated to give $$\frac{\mathcal{N}(d \mid 0, \sigma^2)}{2b}\left( \mathrm{Erf}\left(\frac{c_{r0}}{\sigma\sqrt{2}}\right) - \mathrm{Erf}\left(\frac{c_{r0}-b}{\sigma\sqrt{2}}\right)\right), \quad (15)$$

where $$d^2 = c_{r0}^2 + c_{r1}^2 \quad (16)$$

and Erf( ) is the error function. In the original coordinate system $c_{r0}$ and d are given by $$c_{r0} = \frac{c^T VLn}{|VLn|} \quad (17)$$

And $$d = |c - c_{r0}VLn|. \quad (18)$$

Intuitively $c_{r0}$ corresponds to the distance along the line VLn and d to the displacement perpendicular to this line due to noise. The term containing the two error functions is approximately constant between 0 and |VLn| due to the uniform prior upon α and as such, for practical purposes, can be treated as a constant.

To perform the segmentation of a new scene into different chromaticities in step S405 a Markov Random Field (MRF) is constructed in which each node corresponds to a pixel in the input image and is connected to the node of each of the pixel's neighbours in a 4-neighborhood. Each node will be assigned a label $a \in 1, \ldots, N$ corresponding to one of the N chromaticities in the scene. The constraint that chromaticity should be locally constant is enforced using the Potts model for the pairwise terms in which no cost is assigned to neighbouring pixels sharing a label and a cost is assigned for differing labels. The unary terms are given by the likelihood derived in the previous section. Given a set of N matrices, $V_{a \in 1, \ldots, N}$, the unary term for a pixel taking label a is given by $P(c|n, V_a)$ where the n is taken from the smoothed normal map estimated from the stereo depth map and c is an image intensity taken from a smoothed version of the input image. Smoothing can be used to remove high frequency variation due to fine geometric detail which the stereo algorithm cannot recover.

To ensure that the segmentation boundaries follow region boundaries closely, an edge map of the image is computed and Potts costs for edges in the graph that cross an edge in the edge map are set to γ/100.

Once the MRF has been built, it can be solved using a tree reweighted message passing algorithm and the normals are estimated independently at each pixel using (9) with relevant $V_a$ in step S407. This dense normal map is then combined in step S411 with a low-resolution stereo map derived in step S409 using the techniques discussed in relation to the first embodiment.

Figure 14:
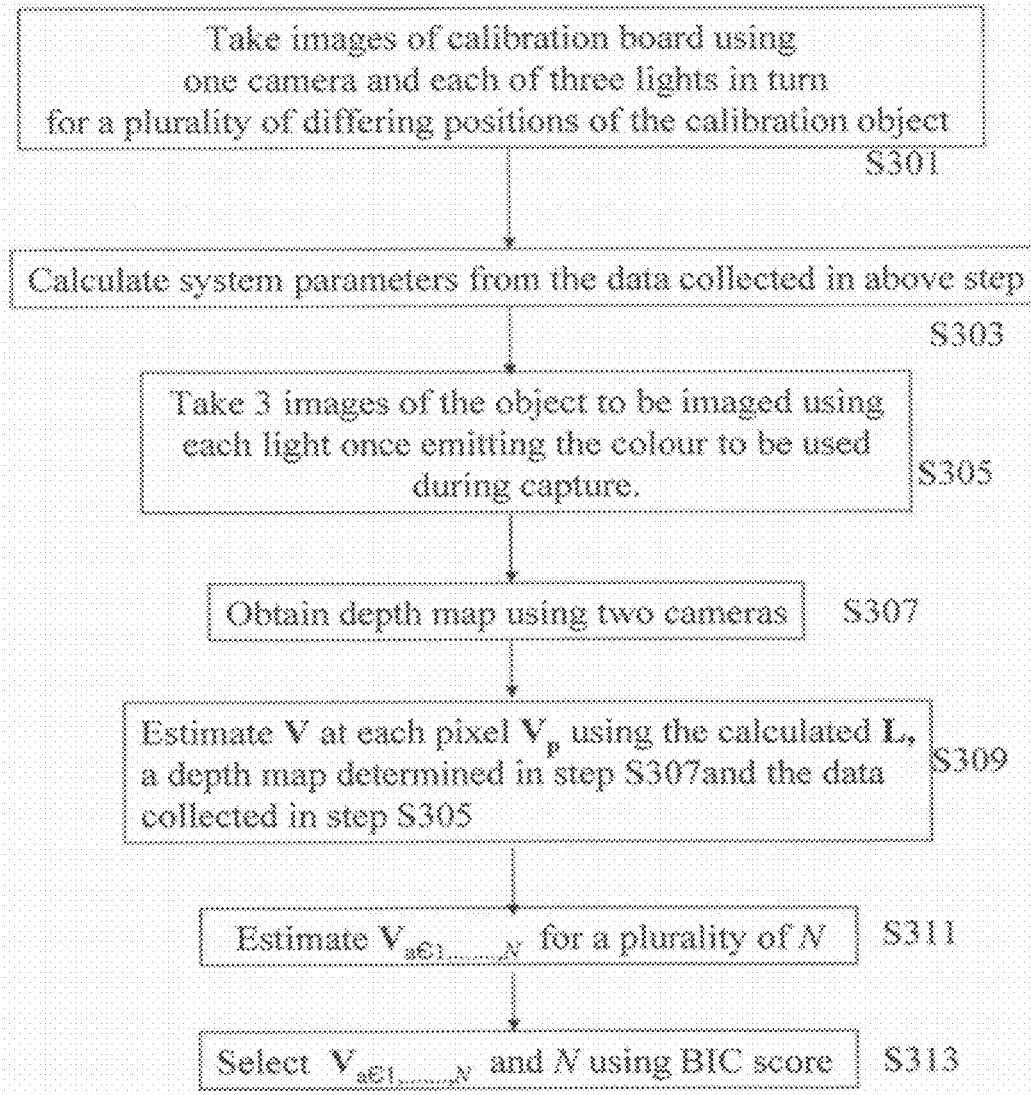
FIG. 14 is a flow diagram showing a calibration method in accordance with a further embodiment present invention.

FIG. 14 shows a flow chart of a calibration method in accordance with an embodiment of the present invention.

The term scene is used to apply to an object or an arrangement of objects which are viewed by the system. The objects may be stationary or non-stationary.

In the calibration procedure, the parameters are estimated which are required for reconstruction of the image. The parameters can be split into 2 two groups:

Group 1—The photometric parameters, N and $V_{a \in 1, \ldots, N}$ where N is the number of different chromaticities and $V_{a \in 1, \ldots, N}$ is a matrix which models the combination of the surface's chromaticity, the spectral distributions of lights and the camera sensors' spectral sensitivities;

Group 2—The system parameters which include the lighting direction matrix L, the image noise σ and the camera intrinsic and extrinsic parameters.

The group 1 parameters need to be estimated for each scene whereas the group 2 parameters only need to be estimated once.

In step S301, estimation of the intrinsic and extrinsic camera parameters is performed by capturing images of a checkerboard pattern which is rotated and translated in the field of view.

Estimation of L is performed in step S303 using a standard method; rotating the same checkerboard pattern with only one light on at a time provides a set of (c, n) pairs from which L can be estimated using a least squares technique.

To estimate σ, several images of a static scene under constant lighting are acquired and $\sigma^2$ is estimated as the average variance of the pixels across the images.

The procedure for estimating N and $V_{a \in 1, \ldots, N}$ can be broken down into three parts:
1. Estimation of V at each pixel individually.
2. Estimation of the N dominant chromaticities, $V_{a \in 1, \ldots, N}$, where N is given.
3. Selection of N as a model order selection problem.

In the method according to this embodiment, to estimate V at every pixel, three images are acquired, $I_r$, $I_g$ and $I_b$, with each light being switched on in one of the images in step S305. It is assumed that scene geometry is constant across the three images.

A stereo reconstruction is also performed in step S307 to give a low-resolution normal map. Given the normal map obtained in step S307 and the previously computed lighting directions in step S303, each of the three images captured in step S305 allows for an estimate of one column of the V matrix to be made at each pixel.

When illuminating with a light of one colour e.g. $I_r$ this reduces to $$c = \alpha[v_0 v_1 v_2][l_0 0 0]^T n = \alpha v_0 l_0^T n. \quad (19)$$

Since c, n and $l_0$ are known, this allows all elements of $v_0$ to be calculated up to the scaling factor α, which is constant across all columns in V. To account for the fact that the stereo normal map does not recover high frequency geometry, each of the three images are smoothed before this process is carried out.

This procedure actually recovers αV at each pixel, not V. However, the scale of V is unimportant during reconstruction. Thus, the each V matrix can be scaled so that the largest c value it can predict given a valid normal has a value not greater than 255. It is possible to ensure that: saturation does not occur in practice by adjusting the camera's exposure and gain settings.

Once an individual calibration matrix has been estimated for each pixel, in methods in accordance with this embodiment, both N, the number of chromaticities present in the scene, and $V_{a \in 1, \ldots, N}$ which are the photometric properties of the N dominant chromaticities in the scene are determined.

Initially assuming that N is known, $V_{a \in 1, \ldots, N}$ can be chosen to explain the scene as well as possible. In one embodiment, a RANSAC-based approach is used. Here, one of the V matrices calculated in step S309 is chosen at random as a hypothesis and the number of pixels in the calibration scene that support it is observed. To measure support for a hypothesis an image under full multispectral lighting $I_{rgb}$ is synthesized according to $I_{rgb} = I_r + I_g + I_b$. Using the pixel intensities c from this synthesized image and the previously computed normals, the likelihood of this (c, n) pair given the hypothesized V matrix can be calculated using (15). If the likelihood is above a threshold value τ the pixel supports the hypothesized matrix, otherwise it does not.

This is repeated a fixed number of times retaining the hypothesis with the most support each time. The final calibration matrix is then found by averaging V over all the pixels that supported the final hypothesis. Once the first calibration matrix has been chosen, all pixels that supported it are removed and the process is repeated to find the next most dominant chromaticity in the scene. This is repeated until N calibration matrices have been recovered. It is also repeated for different values of N in step S311 as will be described in more detail with reference to FIG. 15.

The above procedure assumes that N is already known, however this is not the case. Selection of N can be viewed as a model selection problem in which the increase in the model's ability to explain the input image by increasing N is traded off against the added complexity of the model.

In methods in accordance with this embodiment, an information theoretic model selection method is used. To reduce the chance of overfitting, Bayesian Information Criterion (BIC) is employed as explained below.

Once the RANSAC stage has been carried out to estimate $V_{a \in 1, \ldots, N}$, an MRF can be solved as it would be during reconstruction (described in relation to step S405) so that the correct $V_a$ can be used at each pixel in the image. Assuming pixel-wise independence, the likelihood of the complete image is the product of the pixel likelihoods and hence the BIC score can be calculated using $$BIC = -2 \sum_{i=1}^{n} \ln P(c_i, n_i | V_{a_i}) + mN \ln n, \quad (20)$$

where n is the number of pixels in the image, and m is the number of additional model parameters when increasing N by one, nine in this case. The value of N that produces the lowest BIC score is chosen. In practice this process is repeated for five values of the threshold τ for each N and the lowest BIC score over all N and τ is used.

Figure 15:
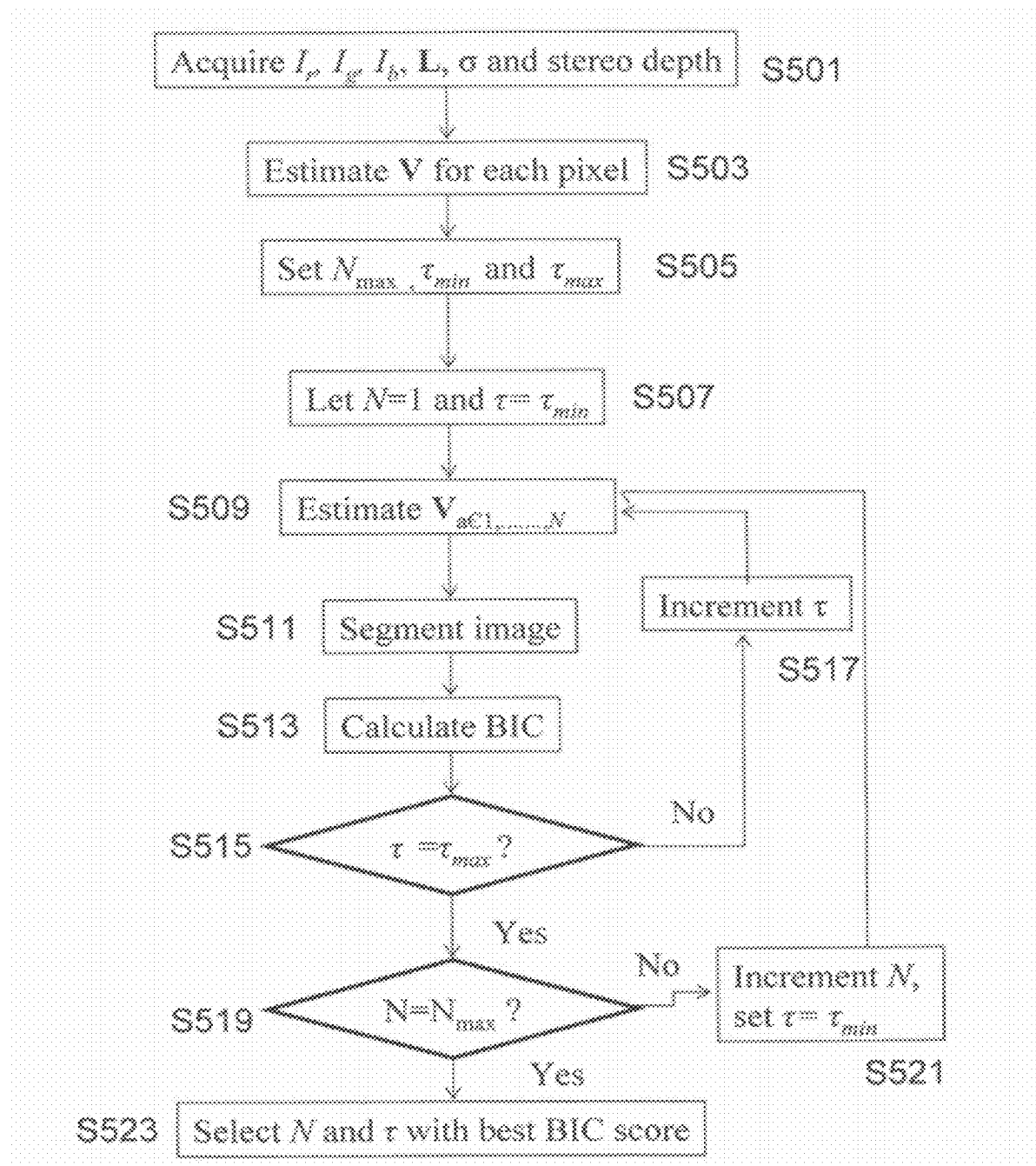
FIG. 15 is a flow diagram showing algorithm implementing the calibration method of FIG. 14.

The calibration method is implemented using an algorithm which will be described with relation to FIG. 15.

In step S501 $I_r$, $I_g$, $I_b$, L, σ and stereo depth map are acquired. On method of acquiring these has been explained in relation to FIG. 14.

In step S503, V for each pixel is estimated as explained with reference to FIG. 14.

In step S505, the range of values for N and τ are set. It will usually be presume that N=1 is the minimum value of N, a value of $N_{max}$ and $\tau_{min}$, $\tau_{max}$ will be set. Typically, an increment for τ will also be set.

In step S57 both N and τ are set to their minimum values. In step S509, the matrices V are estimated for all values from 1 to N. This is performed as described with reference to FIG. 14. Next, the image is segmented in step S511 as described with reference to FIG. 13. Finally, the BIC is calculated in step S513.

In step S515, τ is incremented if it is has not reached its maximum value and the steps S509 to S513 are repeated until τ reaches its maximum value.

In step S519 it is determined is N has reached its maximum value, if not, τ is set to its minimum value, N is incremented by 1 and the cycle of steps S509 to S513 are repeated for all values of τ.

Following the above, the hypothesis for $V_{a \in 1, \ldots, N}$ are tested for all values of N and τ and those values with the best BIC score are selected.

Next, some examples of reconstruction using the above method will be described.

Although the above method can be used for multichromatic scenes, it is also applicable to scenes of uniform chromaticity.

To demonstrate reconstructions in accordance with the above embodiment, a multichromatic scene involving a green and white cushion was processed. Calibration was performed and resulted in N=3 being selected (two chromaticities on the cushion and another for the hands holding it).

Figure 16:
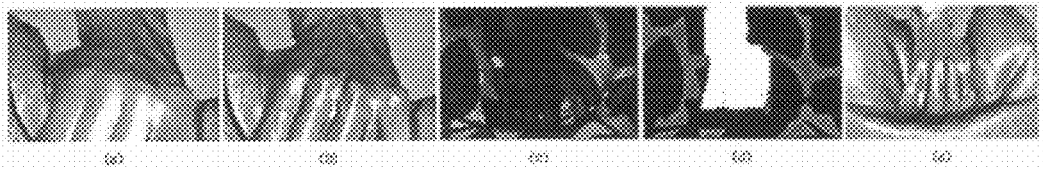
FIG. 16 various images of reconstruction showing varying degrees of chromaticity and segmentation issues.

The results are shown in FIG. 16. FIG. 16a shows results where only one chromaticity is assumed for the entire scene, the hand is recovered incorrectly. However, using the method described with reference to FIGS. 13 to 15, the normals and therefore geometry are correctly estimated, as shown in FIG. 16b.

FIG. 16c shows an input image and FIG. 16d incorrect segmentation for the image of FIG. 16c. The segmentation failed due to strong shadowing. The resulting geometry produced, see FIG. 16e exhibits artefacts.

Figure 17:
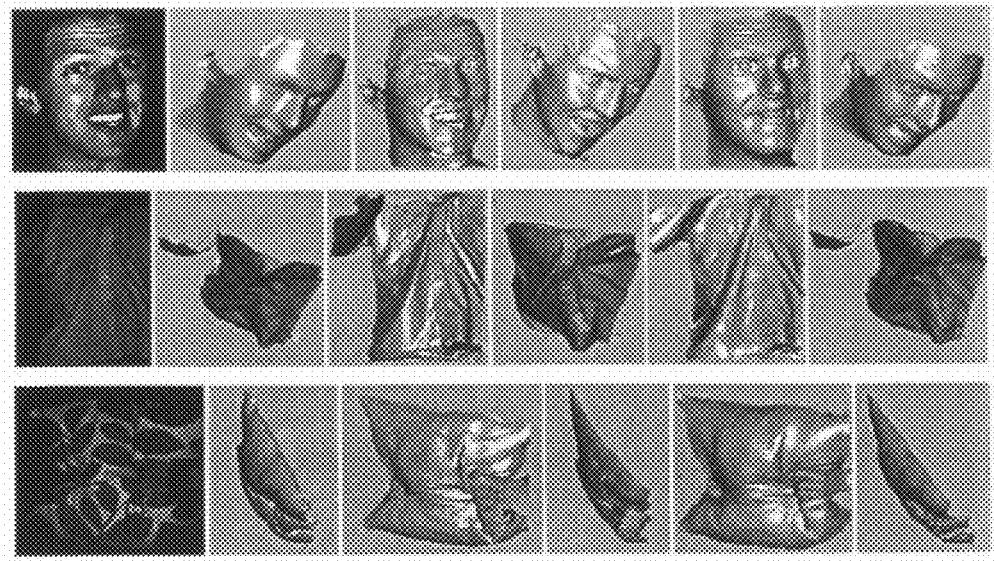
FIG. 17 shows input images and reconstructions of input images developed using methods in accordance with embodiments the present invention.

FIG. 17 shows stills from a film taking using the method described with reference to FIGS. 13 to 15.

In FIG. 17, the images on the left-hand side of the input image. From left to right the next five images show the (i) stereo reconstruction, (ii) the integrated normal field, (iii) novel view of integrated normal field, (iv) final results once stereo information included, and (v) the same novel with stereo results included. In the top row, N=1, the middle row N=2 and the final row N=3.

The second and third columns show results comparable to those achieved by purely photometric systems such as which look convincing when viewed from close to the original viewing direction, but contain low frequency deformations that become apparent when rendered from novel viewpoints. In the combined results, in the final two columns, this low frequency deformation has been removed while retaining high frequency detail.

The image size for these sequences is 1600_1200 and the mean running time of the complete algorithm is 16 seconds per frame, the two most time consuming parts being the stereo reconstruction in CUDA (4 seconds) and the normal field integration (9 seconds) in single-threaded C++. The mean segmentation time is approximately 2 seconds.

In order to demonstrate the accuracy of the approach against ground truth data, a set of experiments on synthetic images was performed. A publicly available high resolution model was rendered in OpenGL. A diffuse albedo was applied to half of the model and the other half was rendered using three different solid colours. A uniform white specular albedo was present over the entire model. An example input image is shown in FIG. 18a.

Figure 18:
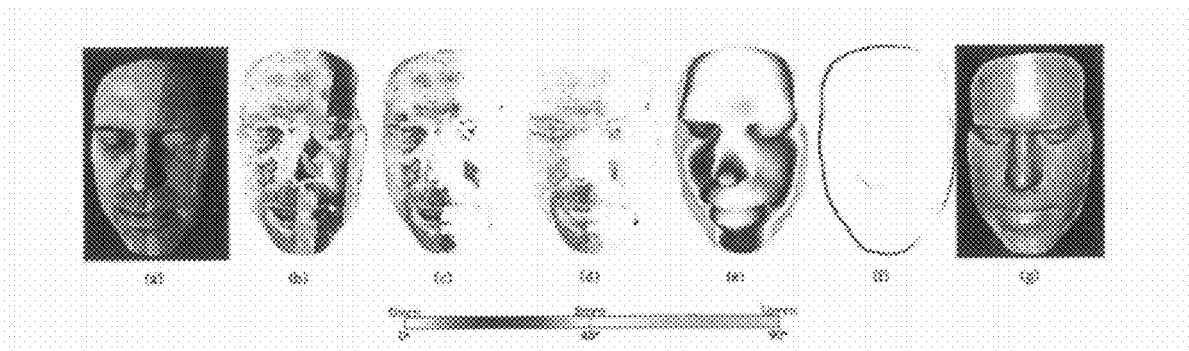
FIG. 18 shows images facilitating a quantitative analysis on a known rendered image.

In FIG. 18 the, normal errors when calculating using known techniques which do not assume any variation in the chromaticity. FIG. 18c shows the normal errors using the proposed method without the addition of low-frequency data and FIG. 18d shows normal error after the addition of the low-frequency data. FIG. 18e shows the errors in depth information after integrating the normal field of FIG. 18c and FIG. 18f shows the depth errors after integrating the normal field of FIGS. 18d which contains low-frequency data. FIG. 18g is the final reconstruction.

Initially no noise was added to the images and reconstruction was carried out. The errors between ground truth normals and recovered normals are shown in FIG. 18c In areas of uniform chromaticity errors are due to specular reflections or region boundaries while in the unmodified half there is a varying level of error introduced by the varying chromaticity.

If the recovered normal field is integrated there is a large discrepancy between recovered depth and ground truth values as shown in FIG. 18e due to a slight bias in the normal estimation. Combining the depth map estimated using stereo with the normal maps greatly reduces this error as shown in FIG. 18f.

To simulate image noise Gaussian noise was added with a standard deviation of 6 independently to each colour channel of each pixel and repeated the above experiments. Numerical results for depth and normal errors are given in table 1. It can be seen that the method accurately estimates normal directions and when combined with the stereo reconstruction gives accurate depths as well.

TABLE 1

|  |  | Normals only Calibration by [°] | Stereo only | Normals only New calibration | Stereo + normals New calibration |
|---|---|---|---|---|---|
| No | Normal error (°). Mean (std dev) | 22.6 (23.2) | 11.8 (10.3) | 3.97 (5.23) | 3.26 (4.07) |
| noise | Depth error (mm). Mean (std dev) | 10.3 (10.9) | 0.39 (1.18) | 6.83 (5.49) | 0.37 (1.23) |
| Noise | Normal error (°). Mean (std dev) | 25.2 (24.1) | 11.9 (10.4) | 9.06 (6.06) | 8.37 (5.62) |
| $\sigma = 6$ | Depth error (mm). Mean (std dev) | 10.3 (10.9) | 0.40 (1.21) | 6.86 (5.51) | 0.38 (1.27) |

In table 1 assuming constant chromaticity leads to large errors. Whilst the stereo data provides accurate depths, the geometry is over-smoothed, making normal estimation inaccurate. The proposed reconstruction method accurately estimates normal directions, but the addition of the stereo data is still aids in the removal of low frequency bias in depth results.

In all of the above experiments N was estimated using model selection with the BIC criterion. However, Other criterion can be used. In further embodiments, negative log likelihoods can be used.

Figure 19:
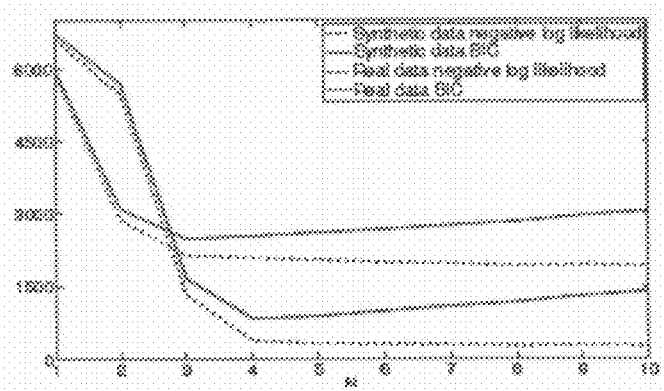
FIG. 19 shows a plot of negative log likelihood and resulting BIC value against the degree of chromaticity.

This is shown in FIG. 19. Here, plots of negative log likelihood and resulting BIC value are plotted as N (the number of colours in the scene) is increased. The lower two traces at N=5 are for synthetic face data with four major chromaticities. The upper two traces at N=5 are for real cushion data for which there are three major chromaticities. In both cases the plots are the average values from 100 runs and dashed lines show negative log likelihood while solid lines show the BIC value.

It can be seen that in both of the above cases, the correct N is chosen. Also in both cases the rates of reduction of log likelihood decreases rapidly beyond the correct N value.

The above embodiment, provides a system for applying multispectral photometric stereo to scenes containing multiple chromaticities by making use of multiview stereo reconstruction. A calibration technique is demonstrated that allows photometric properties to be estimated at each pixel in a calibration scene. In the above embodiment, automatic estimation of the number of chromaticities in such a scene is performed using a model selection approach. Given such calibration information its possible to segment new images into regions of constant chromaticity and produce dense normal map estimates. The resulting system was shown to produce high quality results whilst only requiring two cameras and three light sources.

Systems and methods in accordance with the above embodiment, provide a multispectral photometric stereo technique for capturing geometry of deforming surfaces. A novel photometric calibration technique allows calibration of scenes containing multiple piecewise constant chromaticities. In an embodiment, the method estimates per-pixel photometric properties and then uses a RANSAC-based approach to estimate the dominant chromaticities in the scene. In a further embodiment, a likelihood term is developed linking surface normal, image intensity and photometric properties, which allows estimating the number of chromaticities present in a scene to be framed as a model estimation problem. The Bayesian Information Criterion is applied to automatically estimate the number of chromaticities present during calibration.

In a system in accordance with an embodiment, a two-camera stereo system provides low resolution geometry, allowing the likelihood term to be used in segmenting new images into regions of constant chromaticity. In one embodiment, this segmentation is carried out in a Markov Random Field framework and allows the correct photometric properties to be used at each pixel to estimate a dense normal map.

Methods in accordance with embodiments of the present invention provide a novel calibration technique for multi-spectral photometric stereo that can be applied to objects with multiple piecewise constant chromaticities. Further, in some embodiments, the method allows automatic estimation of the number of chromaticities present during calibration.

The above described embodiments have used 2 cameras to provide a low resolution stereo image and have been presented from the angle of using the low resolution image to enhance data from photometric stereo. In methods and systems in accordance with the below described embodiment, photometric stereo data is used to enhance depth sensor measurements.

In this specific embodiment, the low resolution depth measurements are performed using a depth sensor which operates by projecting a pattern onto the scene to be captured, so called "active lighting depth sensors". However, it is possible to use other depth sensors such as using 2 cameras or time-of-flight depth sensors.

Figure 20:
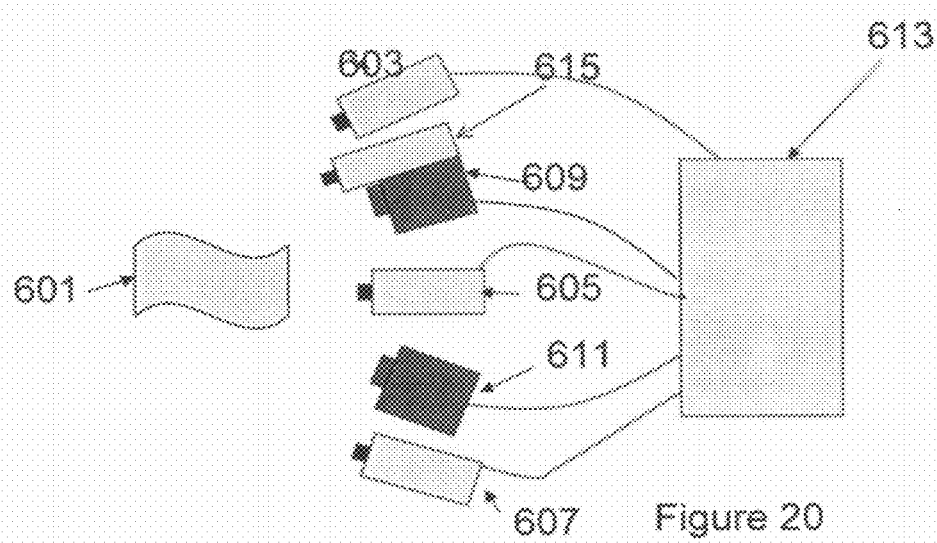
FIG. 20 shows a system in accordance with a further embodiment the present invention.

FIG. 20 shows a system in accordance with a further embodiment of the present invention. The system is used for imaging object 601. The system has three coloured light sources 603, 605 and 607. The arrangement of the light sources same as that described in relation to FIG. 1. Each light source will illuminate object 601 with a different colour. In this particular embodiment, the colours are red, green and blue.

The system also comprises camera 611 which is a video camera and which is configured to distinguish between different colours. Therefore, the camera is capable of both obtaining an image of the object 601 using illumination from three light sources and is also able to pick out the data just arising from illumination with red light, the green light or the blue light individually.

The system of FIG. 20 also comprises a depth sensor. In this particular embodiment, the depth sensor is an active lighting depth sensor. The active lighting depth sensor uses a method called Light Coding, where a known pattern is projected onto the scene in the near-infrared spectrum using an infra-red projector 615. The system comprises an infra-red camera 609 to observe the projected pattern as it is transformed by the object 601.

The observed transformed pattern is then used to infer depth and a depth map can be created.

The system of FIG. 20 combines photometric stereo with the output from a depth sensor. As in the earlier embodiments, for analysing the output from the photometric stereo, a Lambertian imaging model is assumed where given a light source with direction $l_i$ and spectral distribution $S_i(\lambda)$ illuminating a surface with spectral reactance function $\rho(\lambda)$ and unit normal $\hat{n}$, the intensity, $c_j$, observed by a sensor with spectral sensitivity $u_j(\lambda)$ is given by the equation $$c_j = l_i^T \hat{n} \int S_i(\lambda)\rho(\lambda)u_j(\lambda)d\lambda = \alpha v_{ij} l_i^T \hat{n}, \qquad (21)$$

where $\alpha v_{ij} = S_i(\lambda)\rho(\lambda)u_j(\lambda)d\lambda$, with $\alpha$ defining the albedo of the surface and $v_{ij}$ accounting for the chromaticity of the surface, the incident light colour and the spectral sensitivity of the sensor. This means that, for a monochromatic scene, $v_{ij}$ is constant across the scene even if albedo varies. From this point on the albedo scaled normal $n = \alpha \hat{n}$ will be used for compactness as $\hat{n}$ can be recovered from this by renormalizing.

As for the earlier embodiments, given three lights illuminating a scene, the resulting RGB image $c = [c_0 \ c_1 \ c_2]^T$ is given by $$c = [v_0 v_1 v_2][l_0 l_1 l_2]^T n = VLn, \qquad (22)$$

where $vj = [v_{0j} \ v_{1j} \ v_{2j}]^T$ represents the combined response of surface and sensor to light j.

As for the earlier embodiments, given a new input image, a normal map can be reconstructed using $$n = (VL)^{-1} c. \qquad (23)$$

Figure 22:
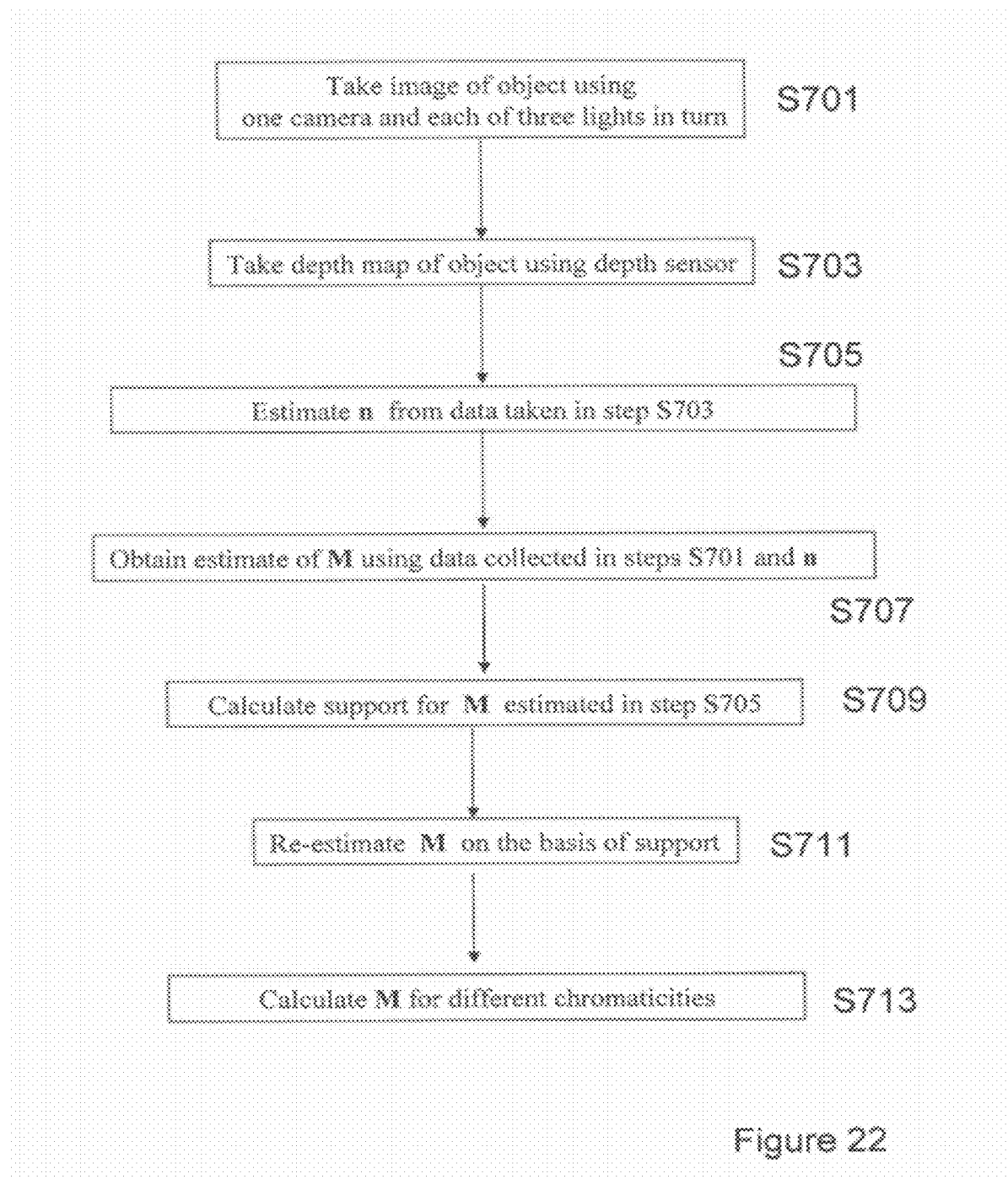
FIG. 22 is a flow diagram showing a calibration method in accordance with a further embodiment present invention.

In methods in accordance with this embodiment, to calibrate the photometric setup, the matrix $M = VL$ must be found. The calibration will be described with reference to the flowchart of FIG. 22.

Figure 21:
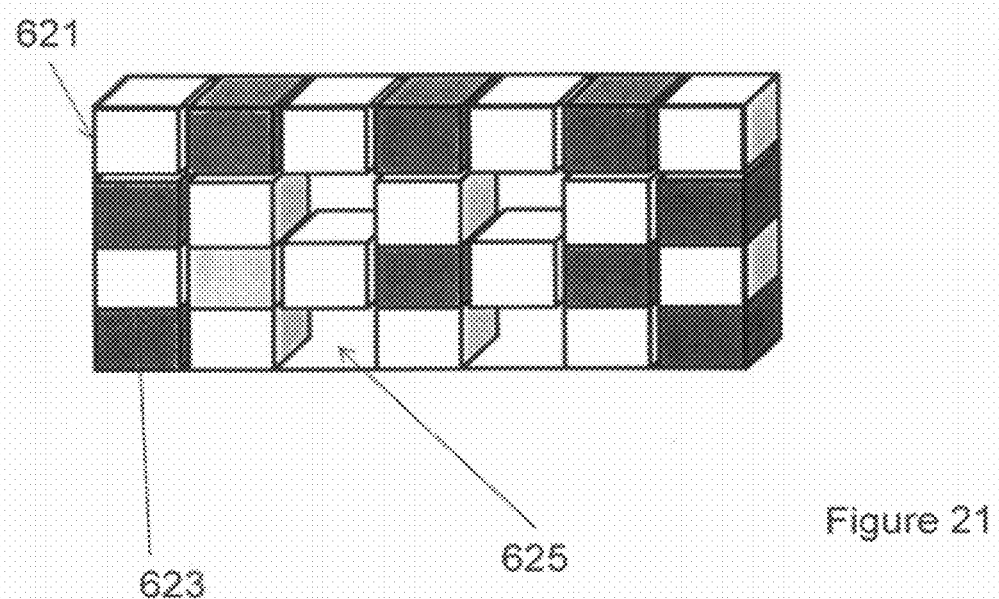
FIG. 21 shows a calibration board for use in calibration method in accordance with embodiments of the present invention.

Method in accordance with this embodiment combine photometric stereo with data from a depth sensor. To aid alignment between the images collected using both techniques, a registration procedure is used. In this embodiment, the registration procedure uses a calibration object 621 as shown in FIG. 21. The calibration object 621 comprises a chequerboard pattern 623, some of the squares 625 have been removed.

Depending upon the type of depth camera used the depth image and photometric image may be inherently aligned. However, if this is not the case then registration between the two must be carried out. In a chequerboard 621, some of the squares have been removed. Images of the chequerboard are captured using a dark background. The depth images produced by this method may not have clean corners at the edges of the cut out squares which results in corner localization approaches failing. More robust results can be obtained by fitting lines to the pattern and using points of intersection as estimates of corner locations.

Once alignment has completed, the calibration process can be performed. In step S701, images are taken the object using one camera and each of the three lights in turn. A depth map of the object is also collected in step S703 using the depth sensor. This data, it is possible to estimate n for various pixels.

In step S707 (c,n) pairs are used to robustly estimate M through a RANSAC based algorithm. Three such pairs are sufficient to estimate M by solving the linear system c=Mn, however the three pairs must come from points on the surface with the same chromaticity and this is not known a priori. Therefore, three points are chosen at random and are used to estimate $M_e$, then support is measured in step S709 from all other pairs by testing for each pair whether $$|c_f - M_e n| < \tau, \quad (24)$$

where $\tau$ is a threshold value and $c_f$ is the pixel value. If $M_e$ is a good estimate, it correctly predicts the image colour from the normal map. Further sets of (c,n) pairs are chosen at random until the RANSAC stopping criteria are met. Subsequently an estimate of M is made using a least squares approach from all pairs which supported the last accepted $M_e$ in step S713.

As mentioned above, the normals n are derived from the depth camera measurements. The calibration technique can be applied to a single frame or to a sequence, but it must be guaranteed that a wide range of normal directions are present to make the estimation of M well posed.

Once an estimate of M has been made, if other chromaticities are present in the scene, a second M can be estimated in step S713 having first removed all pairs that supported the first estimate. This allows multichromatic scenes to be dealt with under the assumption that the colours present are piecewise constant.

Figure 23:
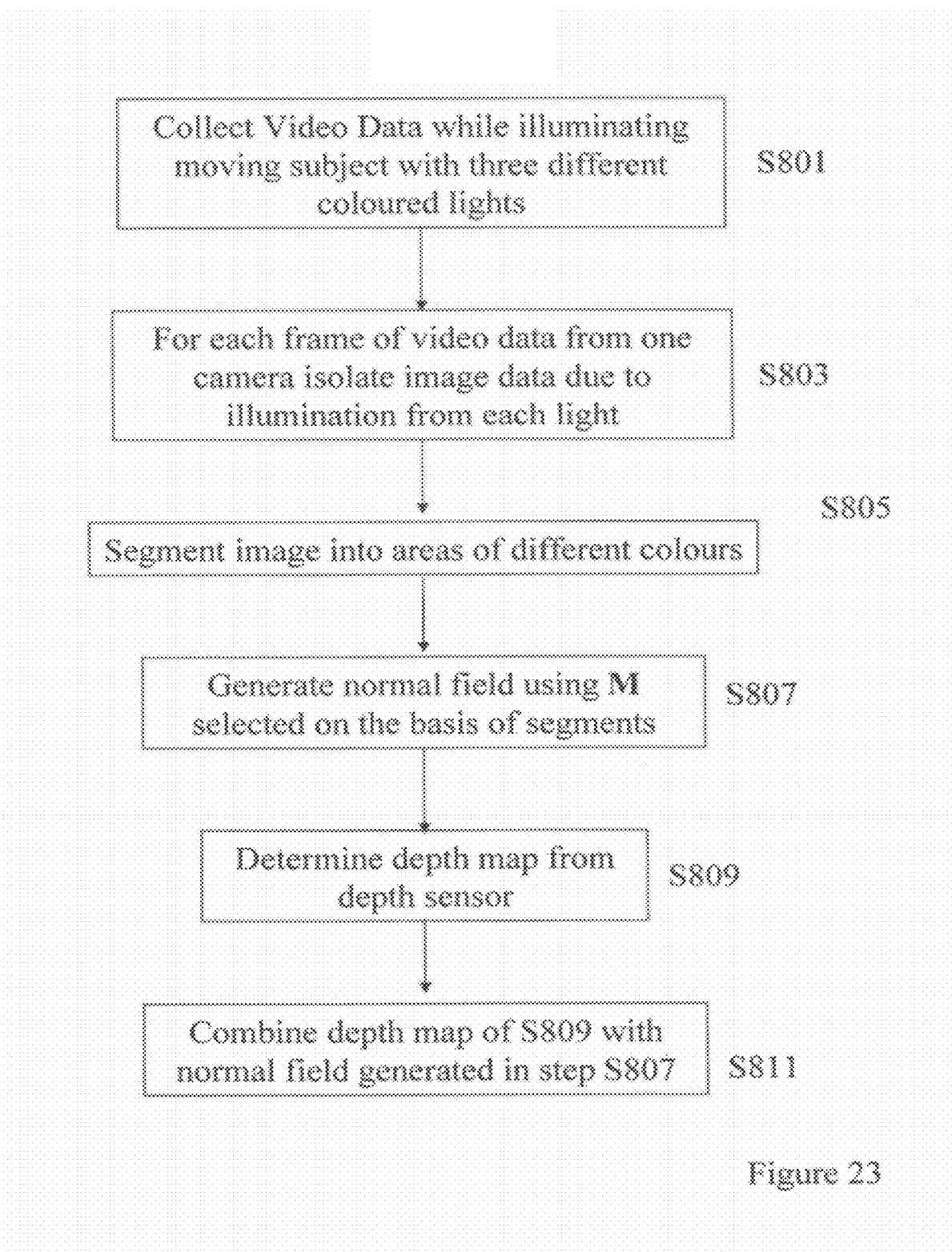
FIG. 23 is a flow diagram showing a reconstruction method in accordance with a further embodiment of the present invention.

A reconstruction process using a method in accordance with this implement will be described with reference to FIG. 23.

As in the earlier embodiments use of photometric stereo, video data is collected while illuminating a moving subject with three different coloured lights in step S801. For each frame of video data, using a single camera, the image data due to illumination from each light is isolated in step S803.

The detail is then segmented into areas of different colours in step S805. This step is performed to determine which M matrix to use to estimate n at each pixel. The segmentation is set up in a Markov Random Field (MRF) framework with one node for each pixel that is not shadowed in the input image. Edges are added between nodes corresponding to neighbouring pixels within a 4-neighborhood.

The depth image from the depth sensor is smoothed and a normal $n_s$ is calculated from it at each pixel. The input image is smoothed by the same amount to give a smoothed image value $c_s$ at each pixel and the unary term for using matrix $M_i$ is given by $$|c_s - M_i n_s|^2. \quad (25)$$

This encourages calibration matrices to be chosen which produce a normal map with similar low frequency characteristics to the depth image.

In this embodiment, the Potts model is used for the pairwise terms in which no cost is assigned to neighbouring pixels sharing a label and a cost $\gamma$ is assigned if they have different labels. The cost $\gamma$ is modulated by an edge map of the input image found by Sobel filtering and thresholding. For pixels not on an edge the value of $\gamma$ is large while for pixels on an edge $\gamma$ is smaller. The maximum a posteriori (MAP) solution to the MRF is estimated using the tree reweighted message passing algorithm and reconstruction is based upon the labels assigned. This allows a normal field to be constructed in step S807.

A depth image is determined in step S809 from the depth sensor. From this a 3D mesh is created. Using the calibration information obtained using the calibration object 621, this mesh is transformed into the coordinate system of the photometric stereo apparatus and ray tracing is used to produce a depth image from the point of view of the photometric stereo camera. This approach is suitable for combining depth and photometric stereo images of the same resolution, or for combining depth images with much higher resolution colour images.

Once values from the depth image obtained in step S809 have been projected onto the image obtained from the normal field in step S807, the two types of information are combined.

First the low frequency bias in the normal field obtained in step S807 is removed by rotating each normal so that a blurred version of the normal field matches the normals calculated from a blurred version of the depth map. Geometry is then estimated by optimizing an energy function which forces the surface to fit both the observed depths from step S809 and normals from step S807.

To exemplify the above technique, the following experiments were performed with an active lighting depth sensor with a combined (and already aligned) colour camera which is capable of detecting colour images independent of the active lighting depth sensor. The active lighting depth sensors and colour camera have a resolution of 640×480 in both the depth and colour domains. In addition three projectors were arranged in a triangular configuration around the sensor to provide light sources of different colours. Since the depth camera operates in the near-infrared range the additional lights does not interfere with it. A Grasshopper camera with a resolution of 1600×1200 was used as a secondary high resolution camera. Depth and colour images were captured from the active lighting depth sensors with the colour camera at an average rate of 30 fps. Average processing time was 6 seconds per frame using single threaded C++.

To measure temporal flicker, 30 reconstructions of a static scene were carried out, and the standard deviation of the estimated depth value at each pixel that was successfully reconstructed in all 30 frames was calculated. This was carried out on three scenes and the average results were computed.

Figure 24:
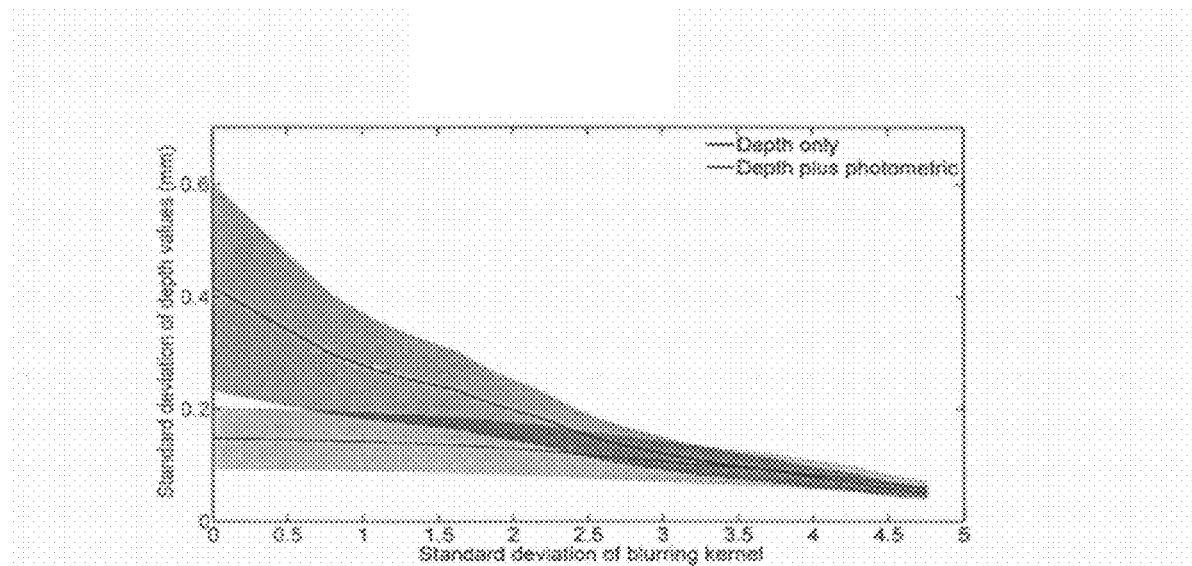
FIG. 24 is a plot of the temporal noise as a function of spatial smoothing in depth images.

FIG. 24 shows temporal noise as a function of spatial smoothing of the depth images. Shaded areas equal to half standard deviation of results. The use of photometric data allows for a reduction in temporal noise without the need for smoothing. The upper trace shows the results from the depth sensor on its own, whereas the lower shows both depth and photometric stereo combined. The temporal noise values are shown as a function of the size of a Gaussian kernel applied independently to each depth image. When there is little spatial smoothing the additional photometric information significantly reduces the magnitude of the temporal noise. While sufficient smoothing does reduce flicker, it also removes fine details, while the addition of photometric data reduces noise as well as enhancing detail. It should be noted that no temporal smoothing is used.

The previous experiment only investigates variations in reconstruction over time and does not give any information about the absolute accuracy of the system. To investigate this, a known planar surface was reconstructed and a plane was fitted to the resulting point cloud using least squares estimation. The average deviation of each reconstructed point from this plane was measured and used as a metric for reconstruction accuracy. Using only the depth information, the average absolute error to the best fit plane was 1.6 min. By including photometric information this error was reduced to 1.2 mm.

Figure 25:
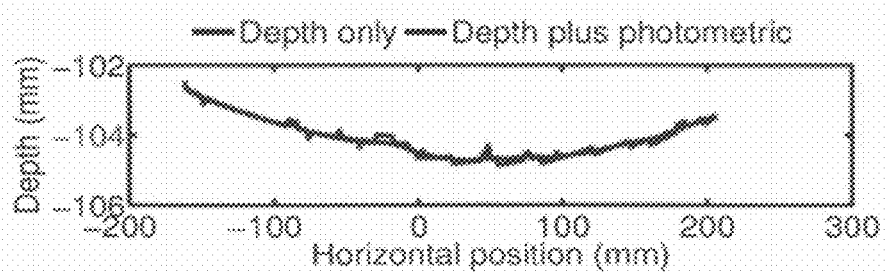
FIG. 25 is a plot showing a slice through a reconstructed plane using a method in accordance with an embodiment the present invention.

The results are shown in FIG. 25. In FIG. 25, the smooth line shows the result from depth combined with photometric stereo whereas the other line shows the result from the depth camera on its own. Photometric stereo can smooth the high frequency noise but does not remove the low frequency deformation.

Figure 26:
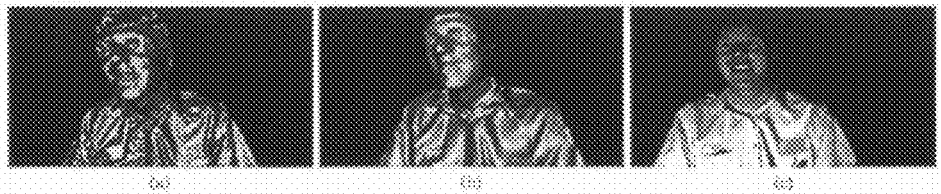
FIG. 26 shows images produced during a reconstruction process in accordance with an embodiment present invention.

To demonstrate the qualitative improvement that incorporating photometric stereo brings to reconstructions of dynamic scenes, several face sequences were captured. FIG. 26 shows an example reconstruction. FIG. 26(a) shows the result from the depth camera only, FIG. 26(b) from the depth camera combined with photometric stereo using the image shown in FIG. 26(c). Here, the image in FIG. 26(c) was from the combined colour camera. It can be seen that the addition of photometric stereo both reduces noise and resolves finer details than are visible in the initial reconstruction. Two calibration matrices were found for this scene, one that modeled the shirt and one that modelled skin.

Figure 27:
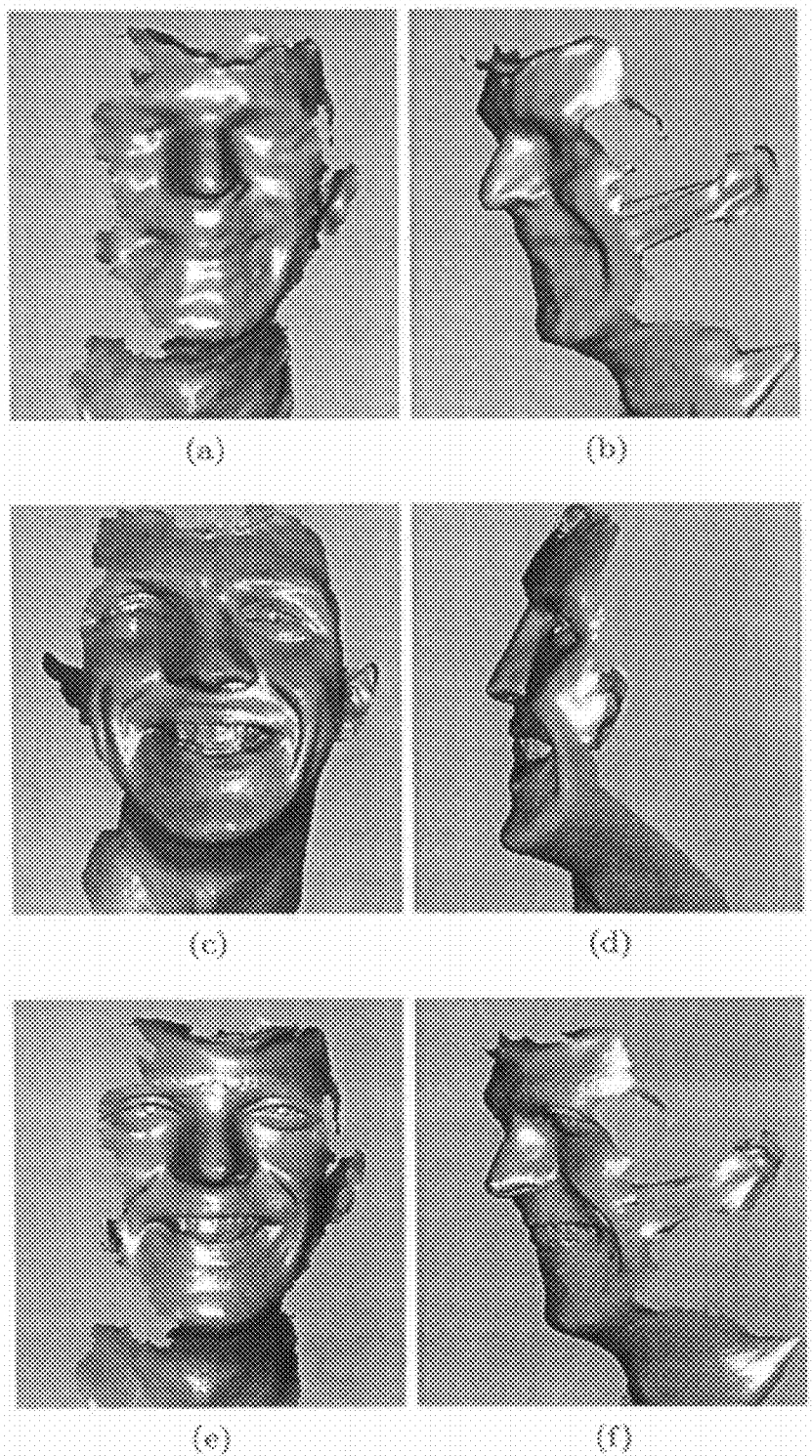
FIG. 27 shows images of reconstructed services using the output from the depths sensor, the output from photometric stereo and the combined output.

FIG. 27 shows reconstructed surfaces rendered from the original viewpoint in the left column and a second, novel viewpoint in the right column. FIGS. 27 a and b reconstruction from depth data only, FIGS. 27 c and d show reconstruction from photometric data only, showing fine detail but suffering from low frequency deformation. FIGS. 27 e and f show the final result combining both photometric stereo and depth map retaining both fine detail and correct global shape.

The quality of reconstruction achieved when a high resolution camera is used to augment the depth camera. The depth camera information is still important as the photometric reconstruction on its own results in low frequency deformations, as seen in FIG. 27d.

Methods and systems in accordance with the above embodiments show that photometric stereo can both reduce the noise present in depth camera outputs and allow for the resolution of fine detail. The modest additional equipment requirements for this approach are three different coloured lights. In a further embodiment, the addition of a high resolution camera allows for more detail to be recovered.

The above method and system augments depth camera output with image-based photometric stereo. The measurements produced by depth cameras contain high frequency noise, which photometric stereo is well suited to reducing. The technique is demonstrated using an active lighting depth sensors with a combined colour camera, but is applicable to a wider variety of depth sensing devices such as time-of-flight sensors. Improved reconstruction is demonstrated using the combined colour camera, and further improvements are achieved by introducing an additional higher resolution camera. The method described shows qualitative improvements in reconstruction as well as a quantitative reduction in temporal noise.

The above has mainly concentrated on the use of the depth camera provided by an active lighting depth sensors with a combined colour camera system. But other types of depth cameras can be used such as time-of-flight cameras and triangulation-based, which produce low resolution range images exhibiting high frequency noise. In the above method photometric stereo is used to augment the output from depth cameras to:
(1) reduce high frequency noise in the output; and
(2) recover finer detail than the depth camera alone can resolve:

The choice of photometric stereo is motivated by its error characteristics which are to provide accurate high frequency data, while tending to introduce error in the global shape, i.e. the low frequency component. Combining the accurate high frequency information from photometric stereo with the accurate low frequency information from the depth camera yields a more accurate reconstruction. In order to produce geometry from every frame multispectral photometric stereo is used, where three lighting directions are captured in a single image by using three different coloured lights to illuminate the scene from separate directions. This allows capture of dynamic scenes.

FIG. 21 showed a calibration board which could be used for aligning the image data captured by different cameras or sensors. The use of such a novel calibration board is not limited to the above described specific embodiments and can be used for any system where it is required to align images captured by two different cameras or sensors. In the calibration board of FIG. 21, there are discontinuities in both the gradients of the lines which comprise in the 2-D pattern (i.e. the corners of the chessboard squares) and there are discontinuities at points in the 3-D relief due to the removal of some of the squares. There are points which are common to both discontinuities in the gradients of the lines of the 2D image and the discontinuities in the 3-D image. In addition to the common points or as an alternative to the points, the squares themselves can be used or at least one of the boundary lines which forms the squares can be used for alignment.

Figure 28:
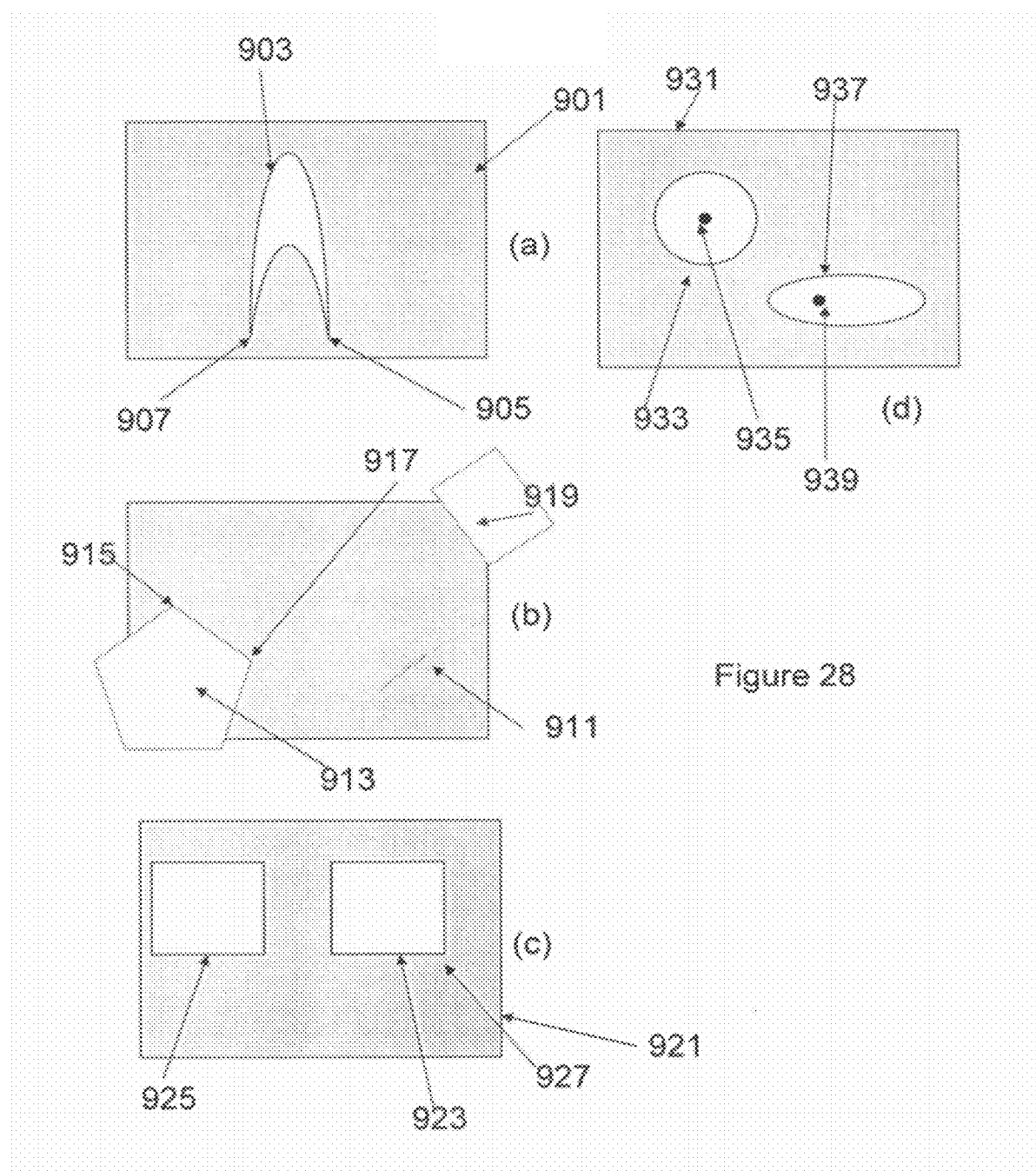
FIG. 28(a) to (d) show schematics of calibration boards in accordance with embodiments of the present invention.

Further variations of this type of calibration board are possible. FIG. 28 shows some possible variations. In FIG. 28(a), a shape 903 is cut out of calibration board 901. The calibration board 901 has a first colour and the shape 903 which is removed provides both a variation in colour and relief. In one embodiment, the boundary of the shape 903 is used as a common feature for alignment in the 2-D image and 3-D relief. It is also possible to use just part of the boundary shape 903.

The shape 903 has two discontinuities in the 2-D image formed at points 905 and 907. These two points form common points as they represent discontinuities in both gradients in lines of the 2D image and the 3D image and can be easily recognise both in 2D image data and 3D image data. In a further embodiment, the boundary line of the shape 903

FIG. 28(b) shows a further variation on the chequerboard arrangement of FIG. 21. Here, a shape 913 has been removed from the calibration board 911. The shape 913 is cut out of the corner of the calibration board 911 such that the shape 913 is open. However, still two points are formed which represent extreme points 915 and 917 or discontinuities in the gradient of the line which bounds the 2-D pattern.

Again, as before, the common points 915 and 917 can be used for alignment or one or more of the lines which forms the boundary of shape 913 can be used for alignment. In a further embodiment, a corner 919 is cut from board 911 and the boundary line of the corner is used as the common feature for alignment since it will represent a discontinuity in the 2-D image on the board and also in the 3-D relief of the board.

A further variation is shown in FIG. 28 (c) which shows two squares 923 and 925 cut out of calibration board 921. Each of the corners 927 of the squares 923 and 925 provide extreme points and are point discontinuities in both the 3-D relief and the gradients of the lines comprising the 2D image on the board to provide the required common points. The shapes 923, 925 themselves can be used for alignment or the corners 927 to provide common features between the 2-D pattern the 3-D relief.

A further variation is shown in FIG. 28(d). Here, the board 931 is provided with a cutout circle 933. The boundary of this circular shape 933 can be used as the common feature or the centre 935 which is defined by the circle 933 can be used as a common feature. In one embodiment, the boundary of the circle 933 is used in the 2D image and the centre of the circle 935 is used in the 3D image to align the two sensors.

Further variations on the shapes possible, for example, an ellipse 937 or elliptical section could be used for alignment and the focus 939 of the ellipse or elliptical section could be used as either a common point or a corresponding point for alignment.

The types of calibration board as mentioned above can be used to align any system, for example, a system which uses a depth sensor such as an image coding depth sensor or time of flight sensor with a standard camera. The standard camera does not have to be configured for photometric stereo measurements.

In the example shown in FIG. 28, the pattern is simply cut from the calibration board. However, more complex arrangements are possible where the pattern is recessed or protrudes from the calibration board or is arranged at an angle to the calibration board such that some parts of the pattern protrude from the calibration board and other parts are recessed from the calibration board.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A system for capturing 3D video data of a dynamic scene, the video data comprising a plurality of frames, the system comprising:
    three light sources, each light source configured to emit light at a different wavelength to the other two sources, the three light sources being configured to illuminate the scene to be captured;
    a first video camera configured to receive light from the light sources which has been reflected from the scene, the first video camera being configured to perform a photometric stereo measurement by isolating light received from each of the light sources and output photometric stereo data relating to the image captured for each of the three light sources;
    a depth sensor configured to obtain, using a non-photometric stereo measurement, non-photometric stereo data in the form of a first depth map of the scene, wherein the depth sensor will produce a depth map with lower frequency resolution in 2D Fourier space than the photometric stereo data;
    a processor configured to:
    receive said photometric stereo data from the first video camera and process said photometric stereo data to obtain data relating to a first normal field obtained from the images captured for each of the three light sources;
    receive said non-photometric stereo data in the form of the first depth map of the scene obtained by the depth sensor using a non-photometric stereo measurement; and
    combine the first normal field with that of the non-photometric data in the form of the first depth map by:
        blurring the data relating to the first normal field, using a blurring kernel and wherein the variance of the blurring kernel is $\sigma^2$ where $\sigma^2$ is set at a value to reduce flickering of surfaces in the dynamic scene between subsequent frames;
        calculating the rotation of the normals of the first normal field caused due to blurring;
        calculating a further normal field from the non-photometric data that has been blurred by the same kernel; and
        applying the calculated rotation of the normals of the first normal field caused due to blurring to the normals of the further normal field, to produce 3D image data of the scene.

2. A system for capturing 3D video data of a dynamic scene, the video data comprising a plurality of frames, the system comprising:
    three light sources, each light source configured to emit light at a different wavelength to the other two sources, the three light sources being configured to illuminate the scene to be captured;
    a first video camera configured to receive from the light sources light which has been reflected from the scene, the first video camera being configured to perform a photometric stereo measurement by isolating light received from each of the light sources and output photometric stereo data relating to the image captured for each of the three light sources;
    a second video camera spatially separate from said first video camera, the first video camera and the second video camera being arranged in a two view stereo arrangement to perform a non-photometric stereo measurement to obtain non-photometric stereo data from the first and second video cameras, the non-photometric stereo data having a lower frequency resolution in 2D Fourier space than the photometric stereo data;
    a processor configured to:
    receive said photometric stereo data from the first video camera and process said photometric stereo data to obtain data relating to a first normal field obtained from the images captured for each of the three light sources;
    receive non-photometric stereo data from the two-view stereo arrangement of the first and second video cameras,
    produce data in the form of a depth map from the non-photometric stereo data, and
    combine the first normal field data with that of the non-photometric data in the form of the depth map by:
        blurring the data relating to the first normal field, using a blurring kernel and wherein the variance of the blurring kernel is $\sigma^2$ where $\sigma^2$ is set at a value to reduce flickering of surfaces in the dynamic scene between subsequent frames;
        calculating the rotation of the normals of the first normal field caused due to blurring;
        calculating a further normal field from the non-photometric data that has been blurred by the same kernel; and
        applying the calculated rotation of the normals of the first normal field caused due to blurring to the normals of the further normal field, to produce 3D image data of the scene.

3. A system according to claim 1, wherein said depth sensor comprises a projector configured to project a pattern on said scene and a camera configured to capture an image of said pattern projected onto the scene, said processor being configured to generate a second depth map from said captured image.

4. A system according to claim 1, wherein said depth sensor comprises a time of flight sensor.

5. A method for producing 3D video data of a dynamic scene the video data comprising a plurality of frames, the method comprising:
receiving photometric stereo data from a first video camera, said photometric stereo data comprising video data captured by said first camera of the scene illuminated from three different directions, the data being capable of isolation into the image data captured for each illumination direction;
receiving non-photometric stereo data in the form of a first depth map of the scene obtained by a depth sensor using a non-photometric stereo measurement, wherein the first depth map will have lower frequency resolution in 2D Fourier space than the photometric stereo data;
analyzing the photometric stereo data received from the first video camera and processing said photometric stereo data to obtain data relating to a first normal field; the method further comprising combining the first normal field data with that of the non-photometric data in the form of the first depth map by blurring the data relating to the first normal field, using a blurring kernel and wherein the variance of the blurring kernel is $\sigma^2$ where $\sigma^2$ is set at a value to reduce flickering of surfaces in the dynamic scene between subsequent frames;
calculating the rotation of the normals of the first normal field caused due to blurring;
calculating a further normal field from the non-photometric data that has been blurred by the same kernel; and
applying the calculated rotation of the normals of the first normal field caused due to blurring to the normals of the further normal field, to produce 3D image data of the scene.

6. A method according to claim 5, wherein the data from the first video camera is analyzed assuming that the scene to be imaged reflects light in accordance with a Lambertian imaging model, wherein:

$$n = (VL)^{-1} c,$$

where $c = [c_0 \ c_1 \ c_2]^T$ where $c_0, c_1, c_2$ are the intensities measured at a pixel in an image captured from illuminating the scene from each of the three directions respectively, n is a vector expressing a normal to a surface of the pixel, V is a matrix which represents the combined response of the surface and the camera to the illumination, and L is a matrix determining the direction of the three illuminating lights.

7. A method according to claim 6, further comprising a calibration procedure, said calibration procedure being configured to determine M, where M=VL.

8. A method according to claim 6, further comprising a calibration procedure, said calibration procedure being configured to determine V and L separately.

9. A method according to claim 8, wherein V is determined for each pixel.

10. A method according to claim 9, wherein a plurality of matrices V are determined for each scene during calibration such that there are N number of matrices V, where N is an integer from 1 to a value less than the number of pixels in a scene.

11. A method according to claim 10, wherein the matrices $V_{a \in 1, \ldots, N}$ are determined using a RANSAC algorithm.

12. A method according to claim 10, wherein the number N is determined automatically on the basis of a model selection method.

13. A method according to claim 9, wherein the data received from the first video camera comprises image data of the scene illuminated under six different conditions, with two different lighting conditions for each of the three directions of illumination, wherein the matrices V are determined for each pixel by analyzing the data under the six different conditions.

14. A method according to claim 9, wherein the matrices V are determined for each pixel by analyzing the data from the three different illumination directions and by calculating the surface normals from data from the depth sensor.

15. A method according to claim 10, wherein analyzing comprises receiving data from said first video camera and said depth sensor on a frame by frame basis, and segmenting the observed scene into regions of constant chromaticity, wherein a matrix of the matrices V are assigned to each region of constant chromaticity.

16. A method according to claim 15, wherein said segmenting is performed using a Markov Random Field network.

17. A method for producing 3D image data of a dynamic scene according to claim 5, wherein photometric stereo data is obtained by illuminating the scene to be captured with three light sources, each light source configured to emit light at a different wavelength to the other two sources; and
capturing an image of the scene using the first video camera configured to receive light from the light sources which has been reflected from the scene, and isolating the light reflected from the scene by each of the light sources.

18. A method according to claim 17, further comprising acquiring calibration data for aligning the data relating to the normal field with that of the first depth map, wherein acquiring said calibration data comprises capturing image data of a calibration board, said calibration board having at least one feature wherein said at least one feature is selected from lines, points or shapes which define a discontinuity in both a 2D pattern formed on said calibration board and a 3D relief of said board.

19. A non-transitory carrier medium carrying computer readable instructions for controlling the computer to carry out the method of claim 5.

* * * * *